United States Patent
Kim

(10) Patent No.: US 12,335,854 B2
(45) Date of Patent: Jun. 17, 2025

(54) COMMUNICATION RELATED TO NETWORK SLICE

(71) Applicant: LG ELECTRONICS INC., Seoul (KR)

(72) Inventor: Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 17/800,521

(22) PCT Filed: Dec. 28, 2020

(86) PCT No.: PCT/KR2020/019211
§ 371 (c)(1),
(2) Date: Aug. 17, 2022

(87) PCT Pub. No.: WO2021/167234
PCT Pub. Date: Aug. 26, 2021

(65) Prior Publication Data
US 2023/0189132 A1  Jun. 15, 2023

(30) Foreign Application Priority Data
Feb. 18, 2020 (KR) .................. 10-2020-0019819

(51) Int. Cl.
*H04W 48/18* (2009.01)
*H04W 48/08* (2009.01)
*H04W 60/00* (2009.01)

(52) U.S. Cl.
CPC ........... *H04W 48/18* (2013.01); *H04W 48/08* (2013.01); *H04W 60/00* (2013.01)

(58) Field of Classification Search
CPC ..... H04W 48/18; H04W 76/15; H04B 7/0413
(Continued)

(56) References Cited

U.S. PATENT DOCUMENTS

2019/0029065 A1* 1/2019 Park ...................... H04W 60/00
2019/0182752 A1* 6/2019 Lou ................... H04W 28/0289

FOREIGN PATENT DOCUMENTS

| KR | 20180047172 | 5/2018 |
| KR | 20190018707 | 2/2019 |

(Continued)

OTHER PUBLICATIONS

3rd Generation Partnership Project (3GPP), "Technical Specification Group Services and System Aspects; System Architecture for the 5G System; Stage 2 (Release 16)," 3GPP TS 23.501 V16.0.0, Mar. 2019, 318 pages.
(Continued)

*Primary Examiner* — Ted M Wang
(74) *Attorney, Agent, or Firm* — LEE, HONG, DEGERMAN, KANG & WAIMEY

(57) ABSTRACT

One disclosure of the present specification provides a method by which UE performs communication related to a network slice. The method may comprise steps in which: a registration request message including information about a network slice which the UE wants to access is transmitted to a network node; a registration acceptance message including information about a standby network slice is received; and information notifying that the standby network slice has been accessed is displayed on the display of the UE on the basis of the information about the standby network slice.

14 Claims, 33 Drawing Sheets

(58) Field of Classification Search
USPC .................................................. 455/435.3
See application file for complete search history.

(56) References Cited

FOREIGN PATENT DOCUMENTS

| WO | 2019024604 | 2/2019 |
| WO | 2019159567 | 8/2019 |

OTHER PUBLICATIONS

Nokia, Nokia Shanghai Bell, "Updates to Solution #8 Protecting NSSAI for transmission on the AS layer," 3GPP TSG-SA WG3 Meeting #96, S3-193122, Aug. 2019, 4 pages.
PCT International Application No. PCT/KR2020/019211, International Search Report dated Mar. 22, 2021, 4 pages.
Korean Intellectual Property Office Application No. 10-2022-7028228, Office Action dated Aug. 30, 2024, 7 pages.
3rd Generation Partnership Project (3GPP), "Technical Specification Group Core Network and Terminals; Non-Access-Stratum (NAS) protocol for 5G System (5GS); Stage 3 (Release 16)," 3GPP TS 24.501 V16.3.0, Dec. 2019, 644 pages.

* cited by examiner

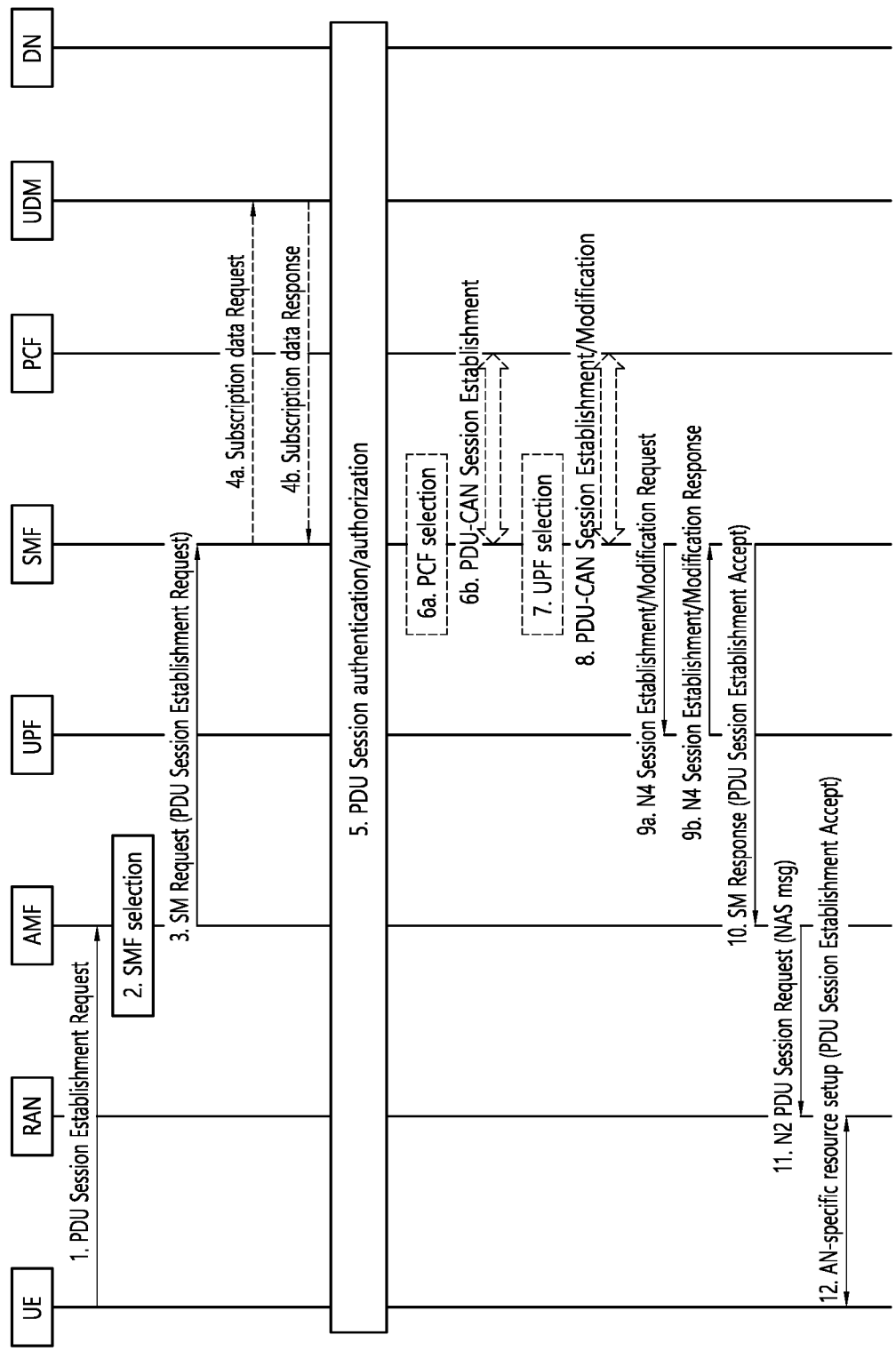

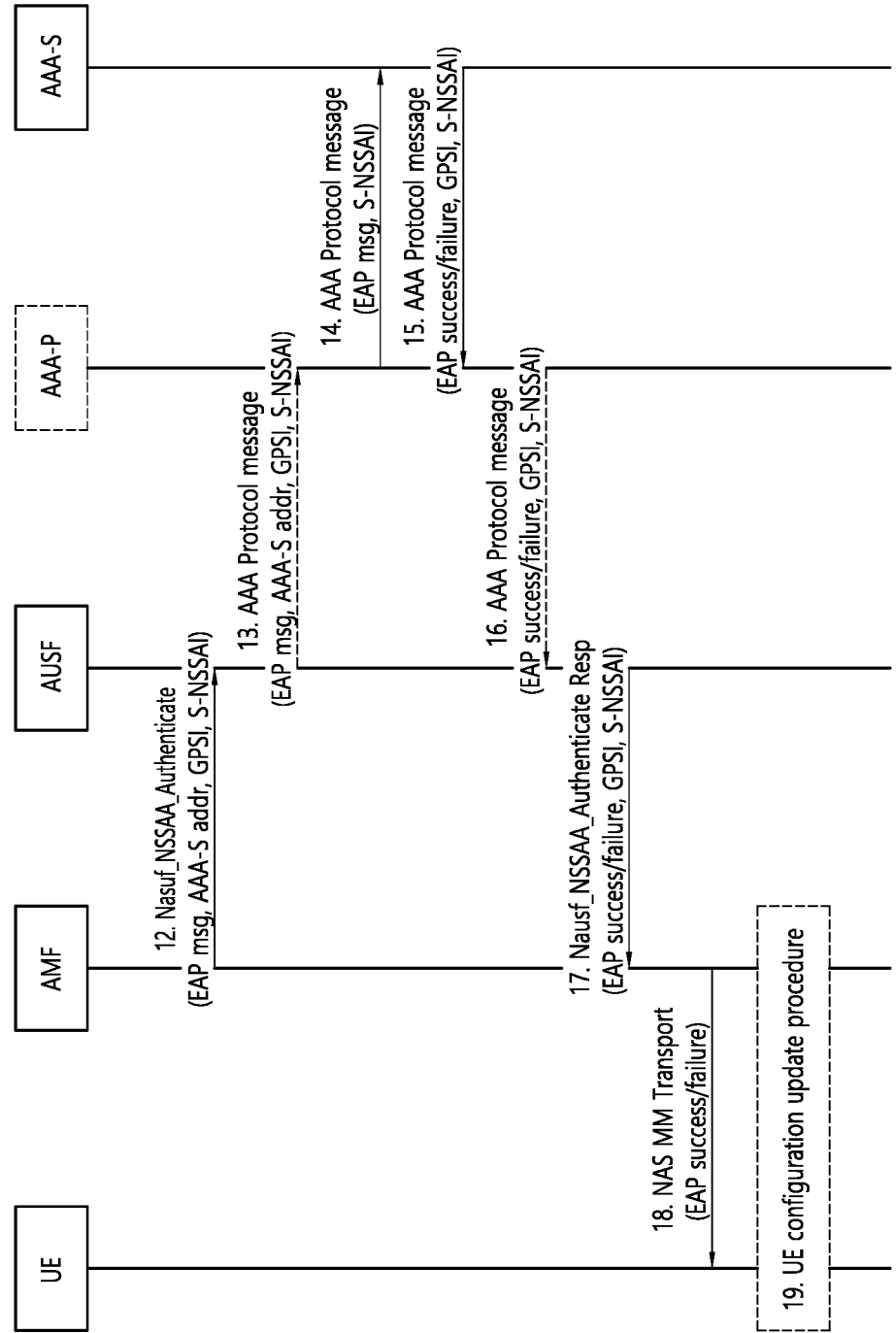

COMMUNICATION RELATED TO NETWORK SLICE

CROSS-REFERENCE TO RELATED APPLICATIONS

This application is the National Stage filing under 35 U.S.C. 371 of International Application No. PCT/KR2020/019211, filed on Dec. 28, 2020, which claims the benefit of earlier filing date and right of priority to Korean Application No. 10-2020-0019819, filed on Feb. 18, 2020, the contents of which are all incorporated by reference herein in their entirety.

TECHNICAL FIELD

The present disclosure generally relates to mobile communication.

BACKGROUND

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

For the fifth generation (so-called 5G) mobile communication, a new radio access technology (New RAT or NR) has been studied.

5G mobile communication, defined by the International Telecommunication Union (ITU), refers to providing a data transmission rate of up to 20 Gbps and a perceived transmission rate of at least 100 Mbps anywhere. The official name is 'IMT-2020', and it aims to commercialize it worldwide in 2020.

Meanwhile, in 5G mobile communication, communication based on network slices has been introduced. A specific network slice may not be able to serve a UE due to various issues (eg, overload of the network slice, limitation of the number of serving UEs/number of PDU sessions according to slice management policy, etc.). In this case, the network may transmit a rejection message to the terminal.

However, the conventional method in which a rejection message is transmitted to the terminal in a batch when the network slice cannot serve the terminal has a problem in that efficient communication is impossible. For example, in terms of the position of the terminal and/or the service received by the terminal, it lacks consideration of the terminal's requested service or the terminal user's will/preference. Due to this, flexibility in the provision of various 5G industries/services may be reduced.

For example, regardless of what kind of situation is the situation in which the network slice cannot serve the terminal (eg, when network resources are insufficient, when the terminal cannot access the network slice due to policy, when $3^{rd}$ party authentication is required, etc.), a reject message is collectively transmitted to the terminal. For this reason, there is a problem that efficient communication is impossible.

For example, even when a network slice is temporarily unavailable, etc, because network unconditionally sends a rejection message to the terminal, flexibility in providing a service to a terminal may be reduced. In addition, even if the terminal cannot access the network slice, it may be necessary for the terminal to communicate with the network including the corresponding network slice, conventionally, since only a rejection message is transmitted, the terminal and the network cannot communicate.

Also, in the related art, in relation to a network slice, a user's selection, a user's preference, a user's setting, and/or a user's input are not reflected. For this reason, in relation to the network slice, consideration of the requested service of the terminal or the will/preference of the terminal user was insufficient.

SUMMARY

Accordingly, a disclosure of the present specification has been made in an effort to solve the aforementioned problem.

In order to solve the above problems, one disclosure of the present specification provides a method for a UE to perform communication related to a network slice. The method includes: transmitting a registration request message including information on a network slice to which the UE wants to access to a network node; receiving a registration accept message including information on a standby network slice; and displaying, on the display of the UE, information indicating that the standby network slice has been accessed, based on the information on the standby network slice.

In order to solve the above problems, one disclosure of the present specification provides a UE that performs communication related to a network slice. The UE includes at least one processor; and at least one memory for storing instructions and operably electrically connectable with the at least one processor, wherein the operations performed based on the instructions being executed by the at least one processor include: transmitting a registration request message including information on a network slice to which the UE wants to access to a network node; receiving a registration accept message including information on a standby network slice; and displaying, on the display of the UE, information indicating that the standby network slice has been accessed, based on the information on the standby network slice.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operations include: generating a registration request message including information on a network slice to be accessed; identifying a registration accept message containing information about the standby network slice; and generating, based on the information on the standby network slice, information indicating that the standby network slice is connected for display on the display of the device.

In order to solve the above problems, one disclosure of the present specification provides a non-volatile computer-readable storage medium in which instructions are recorded. The instructions, when executed by one or more processors, cause the one or more processors to: generating a registration request message including information on a network slice to be accessed; identifying a registration accept message containing information about the standby network slice; and generating, based on the information on the standby network slice, information indicating that the standby network slice is connected for display on the display of the device.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 6a and 6b are signal flow diagrams illustrating an exemplary PDU session establishment procedure.

FIGS. 9a and 9b are flowcharts illustrating a network slice-specific authentication and authorization procedure.

DESCRIPTION OF EXEMPLARY EMBODIMENTS

Figure 1:
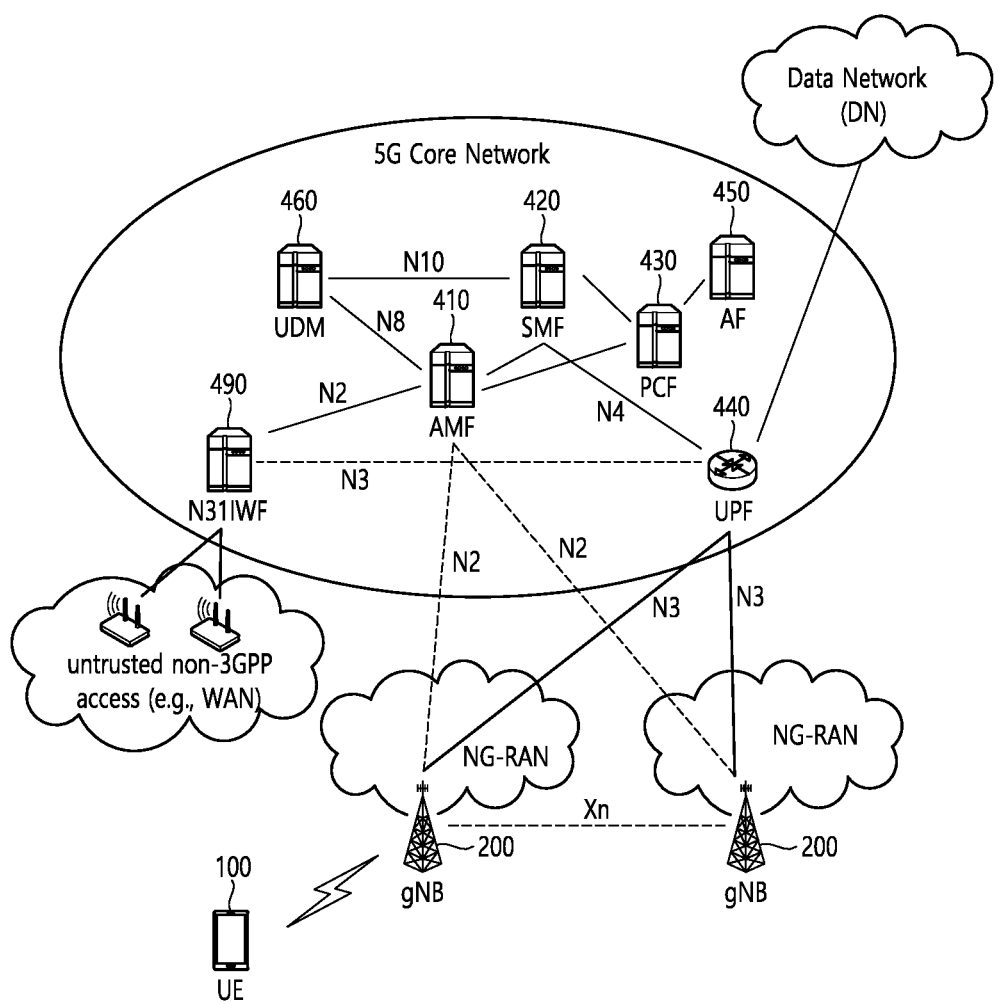
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station communicating with a wireless device, and it may be called another term such as an evolved-NodeB (eNodeB), an evolved-NodeB (eNB), a BTS (Base Transceiver System), an access point (Access Point), gNB (Next generation NodeB), etc.

I. Techniques and Procedures Applicable to the Disclosure of the Present Specification FIG. 1 is a structural diagram of a next-generation mobile communication network.

5GC (5G Core) may include various components, part of which are shown in FIG. 1, including an access and mobility management function (AMF) 410, a session management function (SMF) 420, a policy control function (PCF) 430, a User Plane Function (UPF) 440, an application function (AF) 450, a unified data management (UDM) data network 460, and a non-3GPP (3rd Generation Partnership Project) interworking function (N3IWF) 490.

A UE 100 is connected to a data network via the UPF 440 through a Next Generation Radio Access Network (NG-RAN) including the gNB 200.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing NAS security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 200 and the SMF 420. In addition, when the UE 100 moves over an area served by the gNB 200, the UPF 440 serves as a mobility anchor point. The UPF 440 may perform a function of handling a PDU. For mobility within the NG-RAN (which is defined after 3GPP Release-15), the UPF 440 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (10) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band may be defined as two types of frequency ranges (FR1, FR2). The numerical value of the frequency range may be changed, and for example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be called millimeter wave (mmWave).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 4100 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
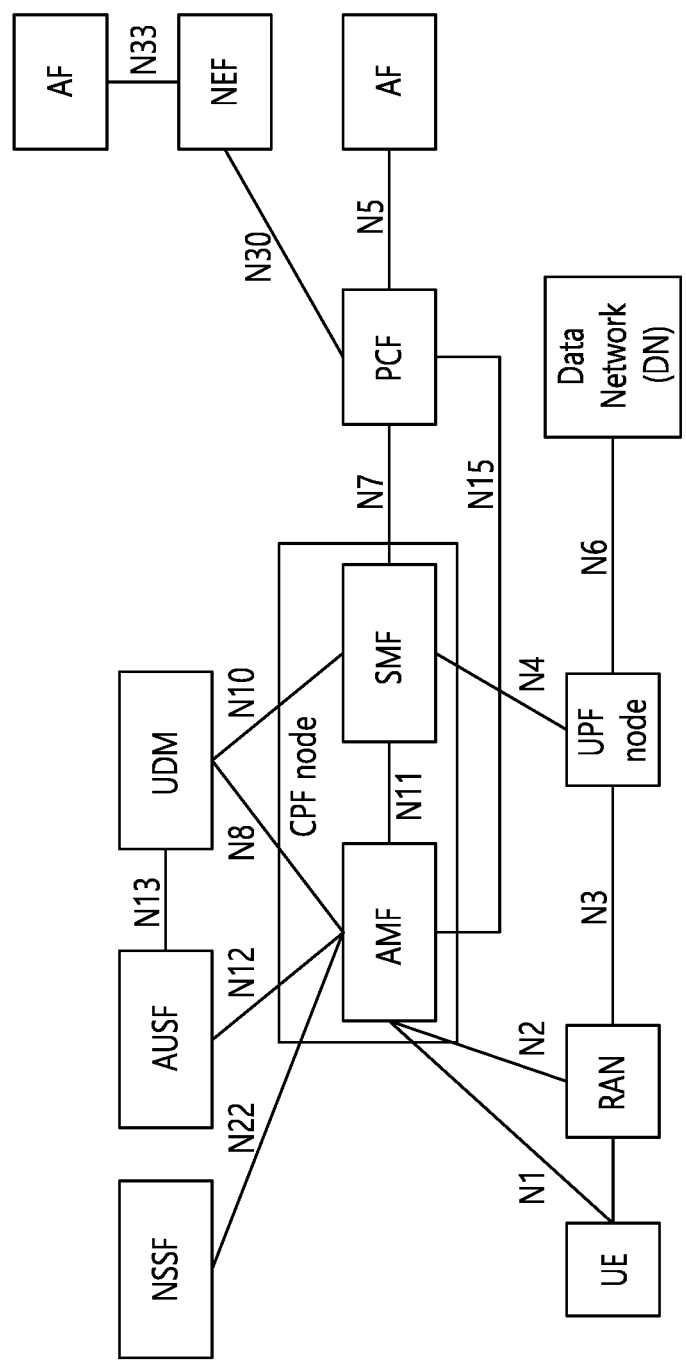
FIG. 2 is an exemplary diagram illustrating an expected structure of next-generation mobile communication from the viewpoint of a node.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
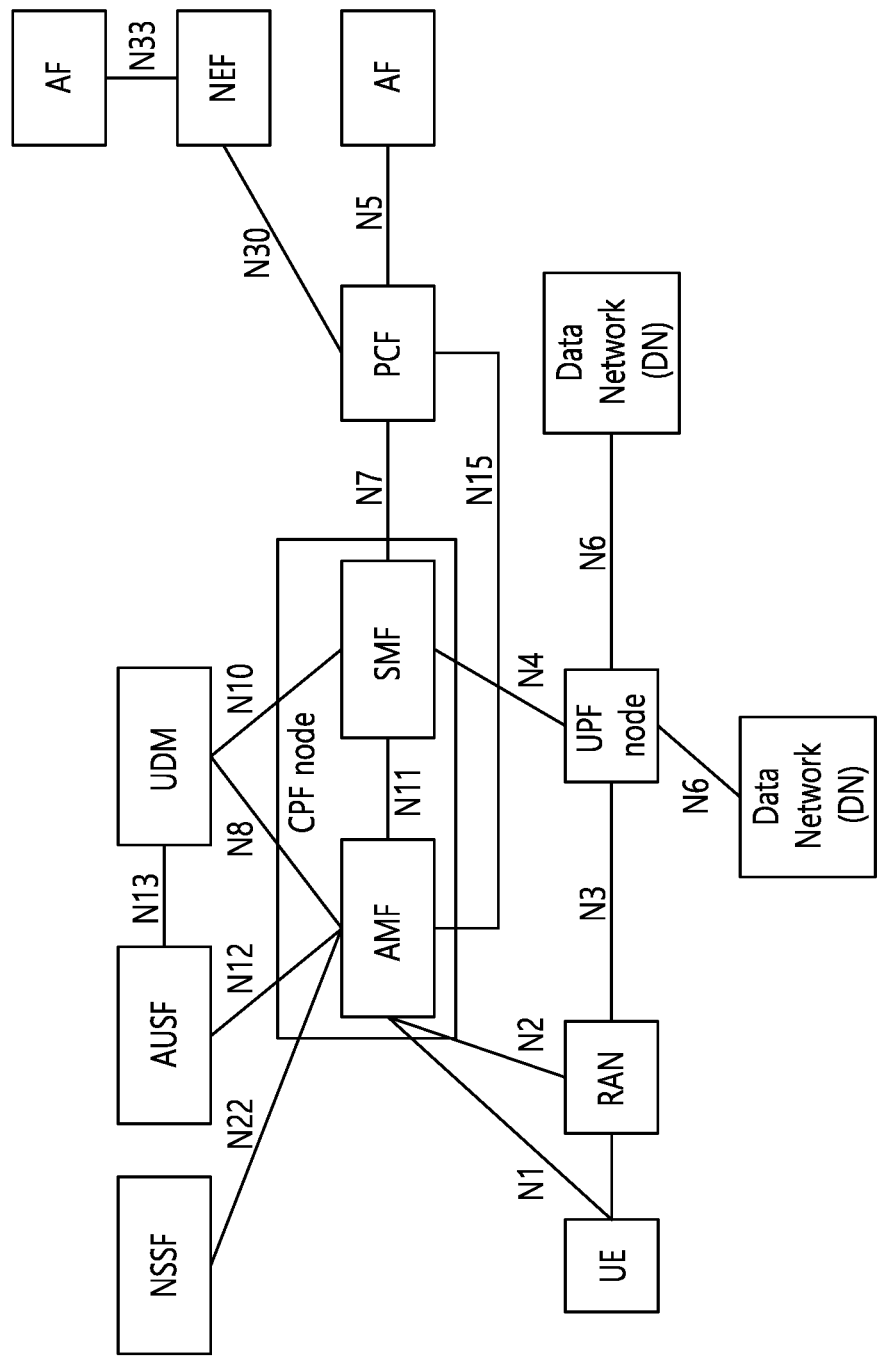
FIG. 3 is an exemplary diagram illustrating an architecture for supporting simultaneous access to two data networks.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.

N2 represents Reference point between NG-RAN and AMF.

N3 represents Reference point between NG-RAN and UPF.

N4 represents Reference point between SMF and UPF.

N5 represents Reference point between PCF and AF.

N6 represents Reference point between UPF and DN.

N7 represents Reference point between SMF and PCF.

N8 represents Reference point between UDM and AMF.

N9 represents Reference point between UPFs.

N10 represents Reference point between UDM and SMF.

N11 represents Reference point between AMF and SMF.

N12 represents Reference point between AMF and AUSF.

N13 represents Reference point between UDM and AUSF.

N14 represents Reference point between AMFs.

N15 represents Reference point between PCF and AMF in a non-roaming scenario and reference point between AMF and PCF of visited network in roaming scenario.

N16 represents Reference point between SMFs.

N22 represents Reference point between AMF and NSSF.

N30 represents Reference point between PCF and NEF.

N33 represents Reference point between AF and NEF.

In FIGS. 2 and 3, AF by a third party other than an operator may be connected to 5GC through a network exposure function (NEF).

Figure 4:
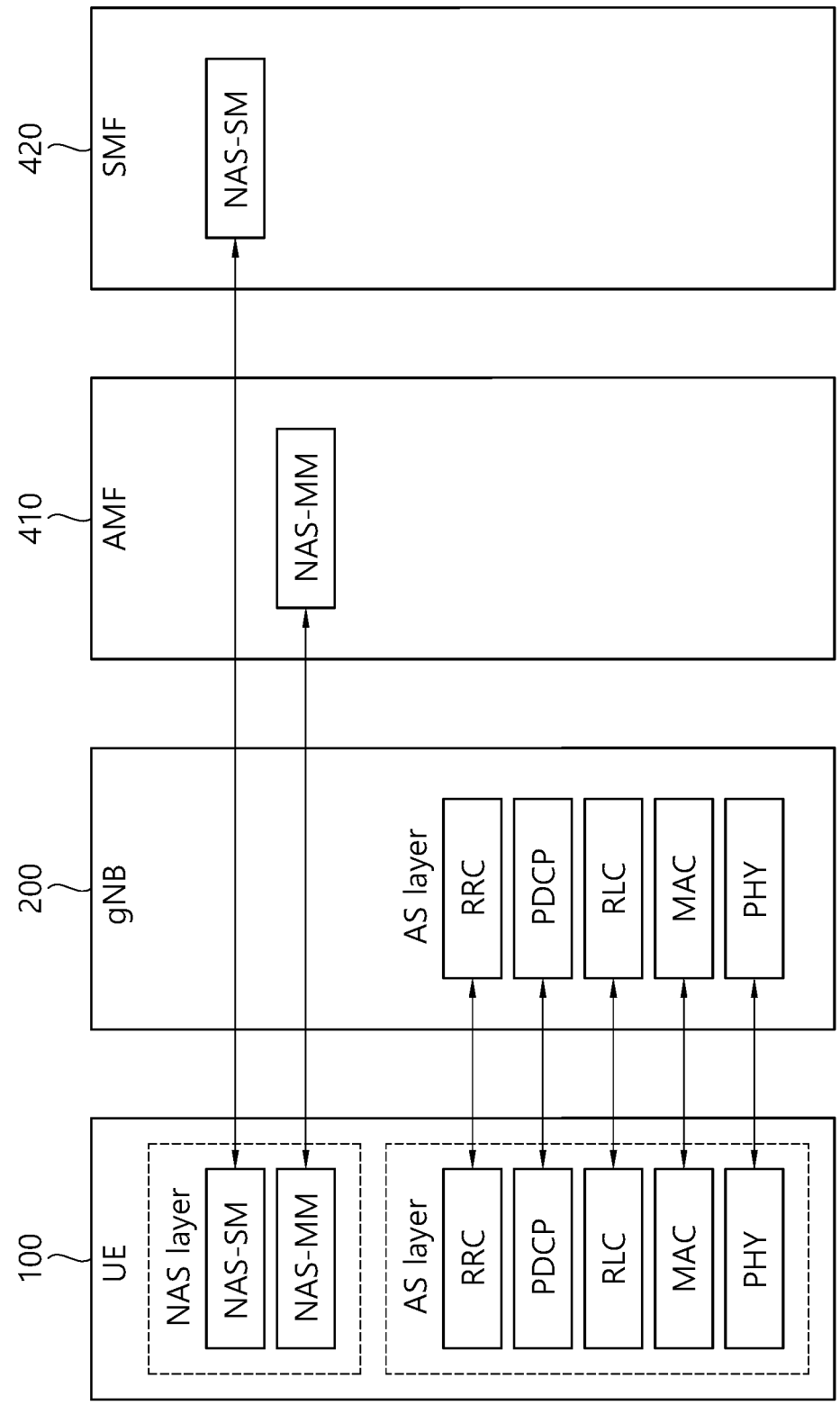
FIG. 4 is another exemplary diagram showing the structure of a radio interface protocol (Radio Interface Protocol) between the UE and the gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,

The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

The UE needs to obtain an authorization to enable mobility tracking, to enable data reception, and to receive services. For this, the UE must register with the network. The registration procedure is performed when the UE needs to do initial registration with the 5G system. In addition, the registration procedure is performed when the UE performs periodic registration update, when moving to a new tracking area (TA) whine the UE is in an idle mode, and when the UE needs to perform periodic registration update.

During the initial registration procedure, the ID of the UE may be obtained from the UE. AMF may deliver PEI (IMEISV) to UDM, SMF and PCF.

Figure 5A:
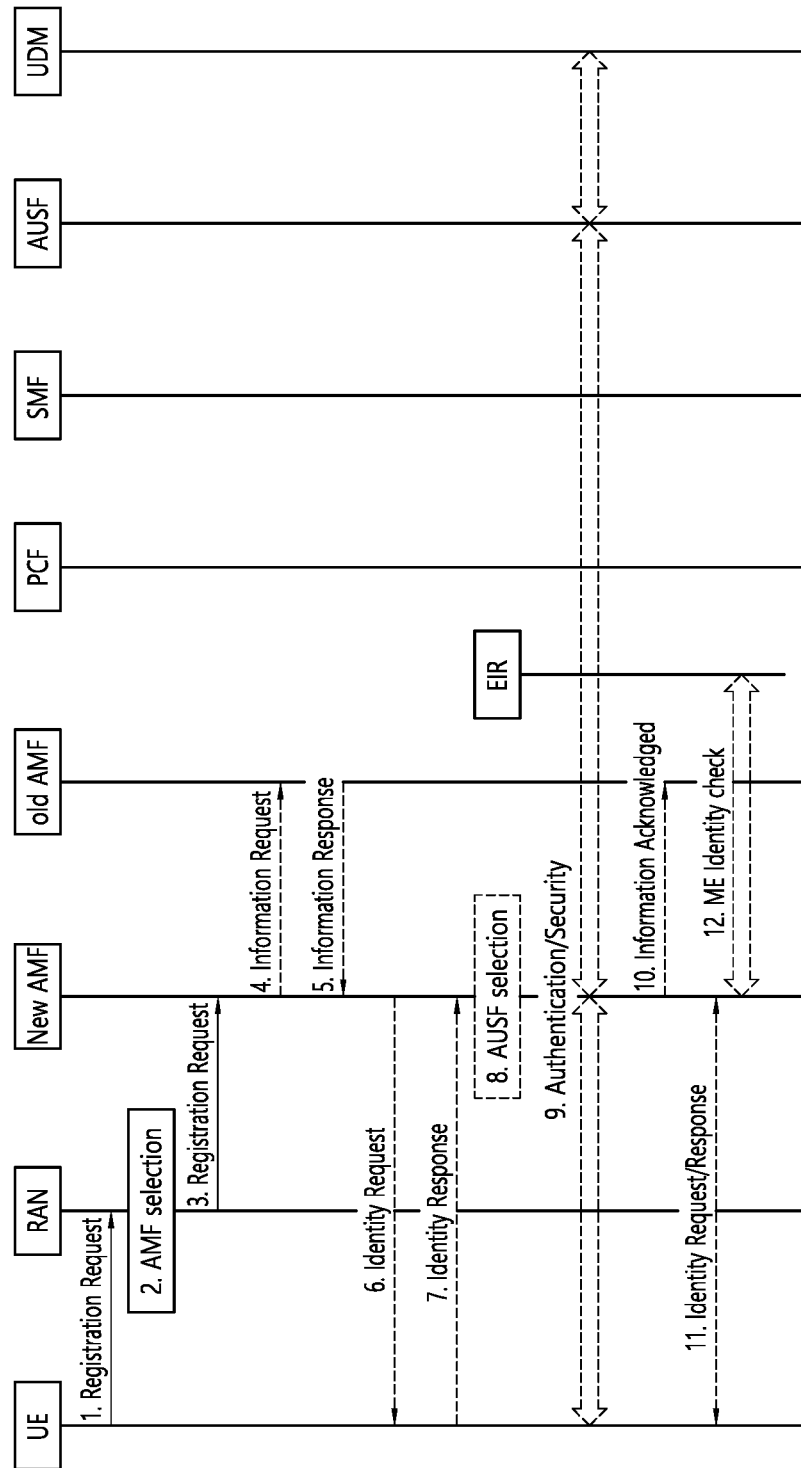
FIGS. 5a and 5b are signal flow diagrams illustrating an exemplary registration procedure.
Figure 5B:
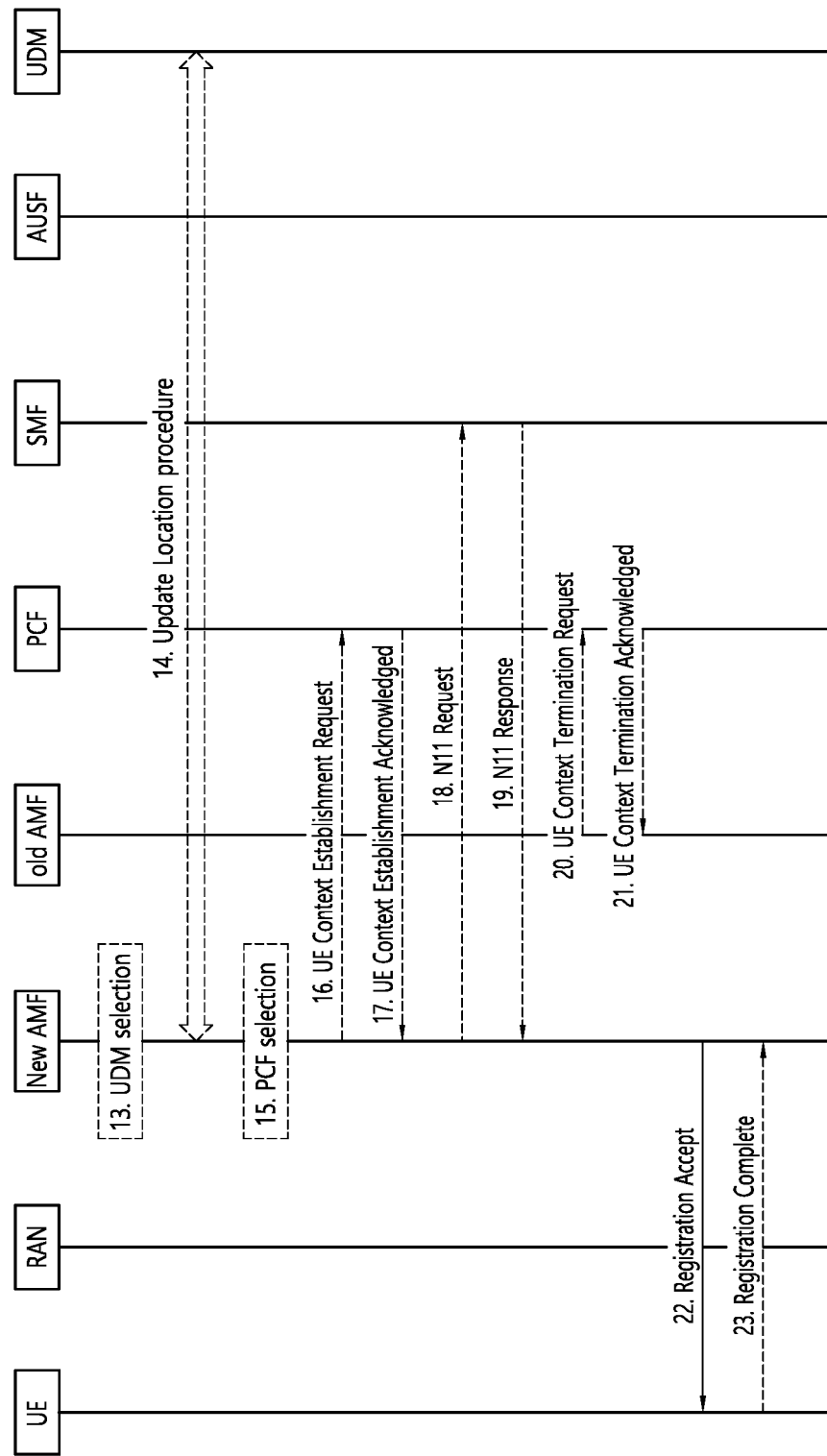

FIGS. 5a and 5b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU (protocol data unit) session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a Public Land Mobile Network (PLMN) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI (Session Network Slice Selection Assistance Information) of the allowed NSSAI (Network Slice Selection Assistance Information) to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU (Protocol Data Unit) Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6B:
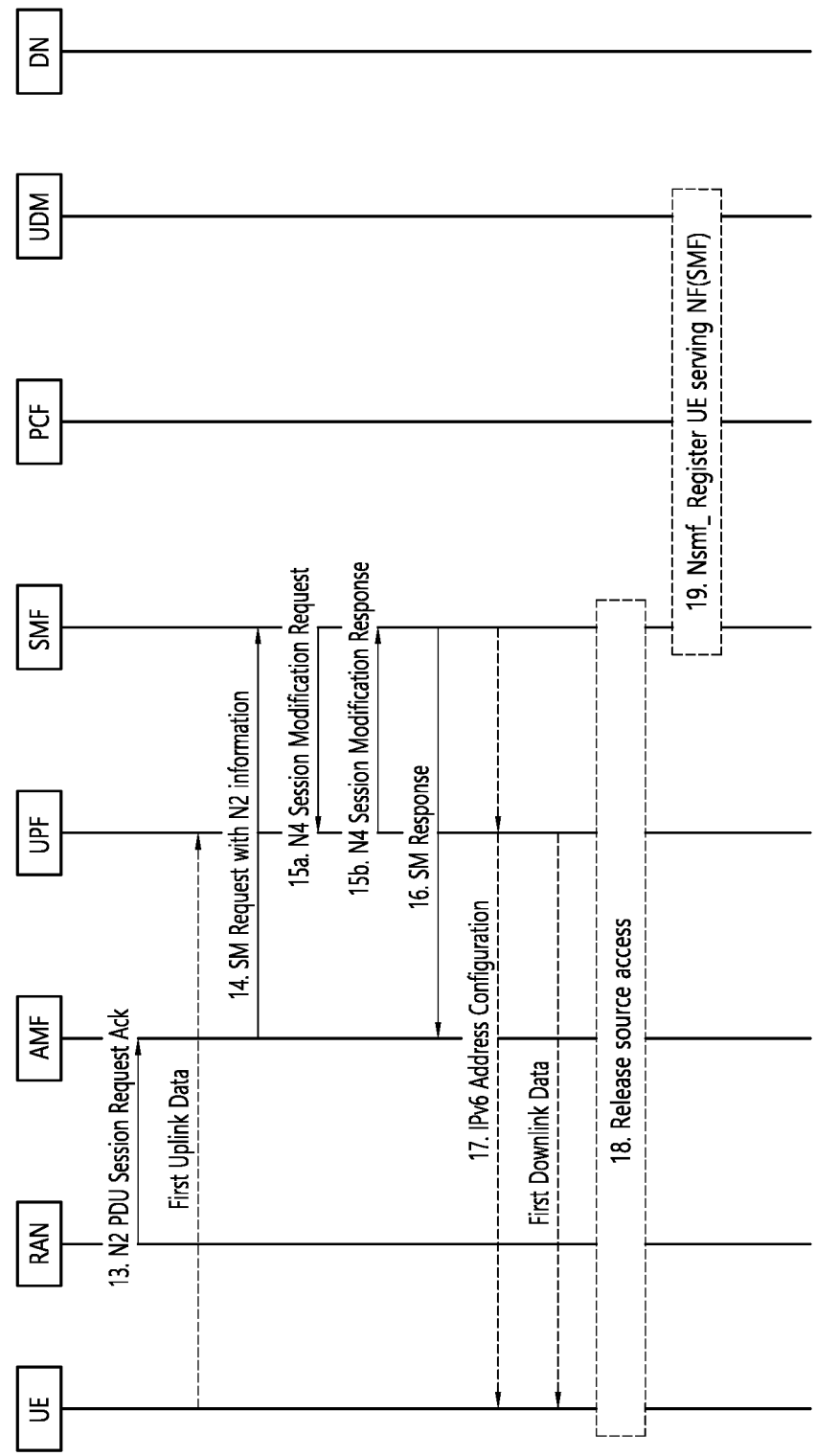

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish anew PDU session, the UE may generate anew PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<Network Slice>

Hereinafter, network slicing to be introduced in next-generation mobile communication will be described.

Next-generation mobile communication introduces the concept of network slicing in order to provide various services through one network. Here, the network slicing is a combination of network nodes having functions necessary to provide a specific service. A network node constituting a slice instance may be a hardware independent node or a logically independent node.

Each slice instance may be composed of a combination of all nodes necessary to configure the entire network. In this case, one slice instance may independently provide a service to the UE.

Alternatively, the slice instance may be composed of a combination of some nodes among nodes constituting the network. In this case, the slice instance may not provide a service to the UE alone, but may provide a service to the UE in association with other existing network nodes. In addition, a plurality of slice instances may provide a service to the UE in association with each other.

A slice instance is different from a dedicated core network in that the entire network node including the Core Network (CN) node and the RAN can be separated. In addition, a slice instance is different from a dedicated core network in that network nodes can simply be logically separated.

For reference, for a network slice, quota may be used.

For example, a quota related to a network slice may include a quota for the maximum number of UEs. The quota for the maximum number of UEs may mean the maximum number of terminals that can use a network slice at the same time. As an example, each network slice information may include quota information for the maximum number of UEs (eg, 10 pieces, 1000000 pieces, etc.).

For example, a quota related to a network slice may include a quota for the maximum number of PDU sessions. The quota for the maximum number of PDU sessions may mean the maximum number of concurrent PDU sessions supported in the network slice. For example, the maximum number of concurrent (concurrent) PDU sessions supported in a network slice may mean the maximum number of PDU sessions established at the same time in one network slice related to a DNN (Data Network Name) defined by S-NS-SAI.

Figure 7:
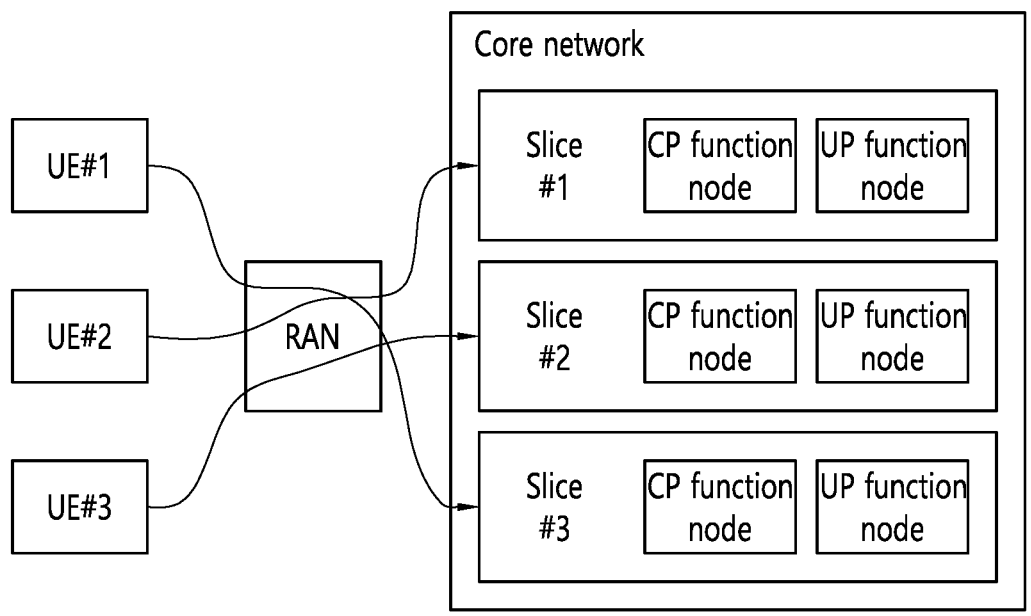
FIG. 7 is an exemplary diagram illustrating an example of an architecture for implementing the concept of network slicing.

FIG. 7 is an exemplary diagram illustrating an example of an architecture for implementing the concept of network slicing.

As can be seen with reference to FIG. 7, the Core Network (CN) may be divided into several slice instances. Each slice instance may include one or more of a CP function node and a UP function node.

Each UE may use a network slice instance suitable for its own service through the RAN.

Unlike shown in FIG. 7, each slice instance may share one or more of a CP function node and a UP function node with another slice instance. This will be described with reference to FIG. 8 as follows.

Figure 8:
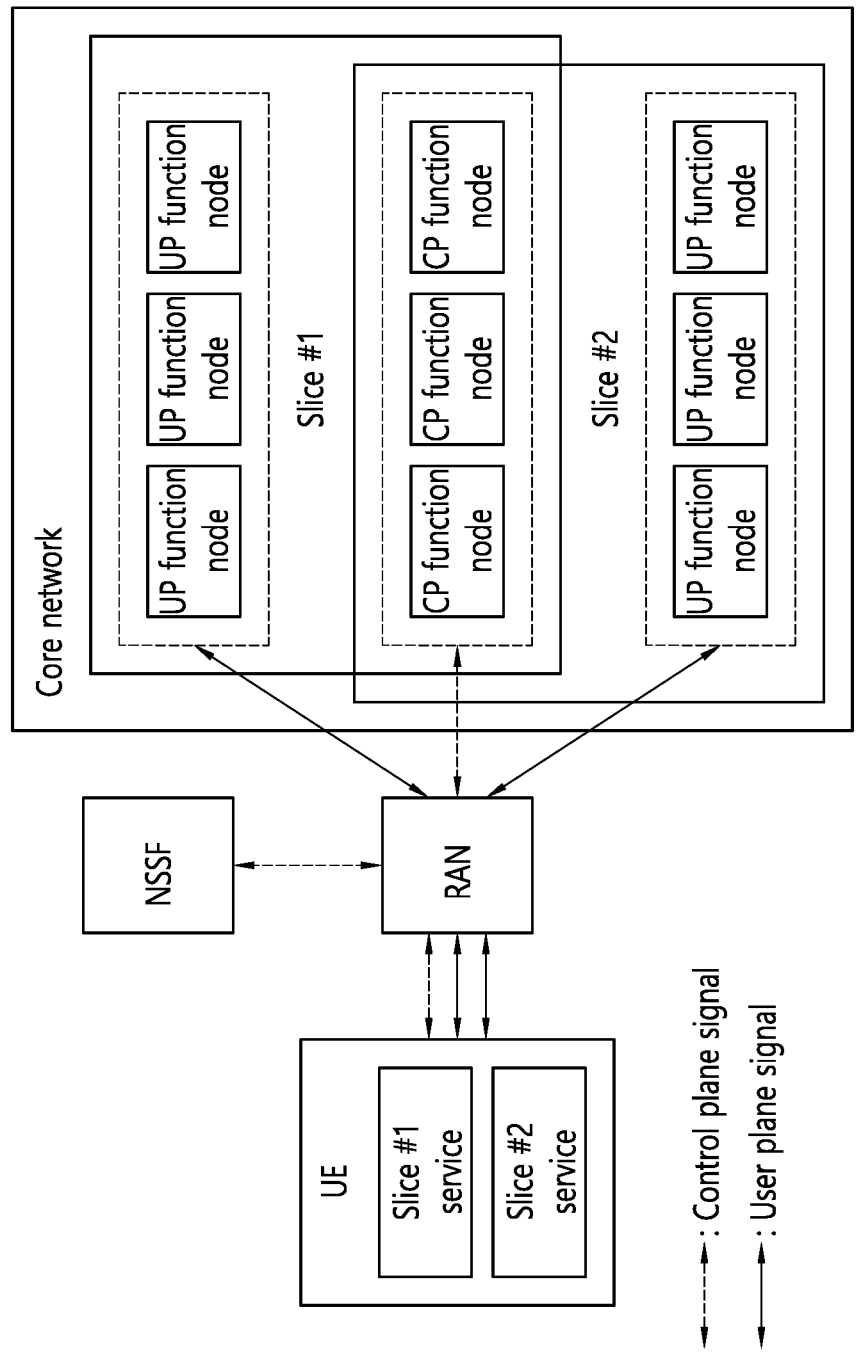
FIG. 8 is an exemplary diagram illustrating another example of an architecture for implementing the concept of network slicing.

FIG. 8 is an exemplary diagram illustrating another example of an architecture for implementing the concept of network slicing.

Referring to FIG. 8, a plurality of UP functional nodes is clustered, and similarly, a plurality of CP functional nodes is also clustered.

And, referring to FIG. 8, slice instance #1 (or referred to as instance #1) in the core network includes the first cluster of UP functional nodes. And, the slice instance #1 shares a cluster of CP functional nodes with slice #2 (or referred to as instance #2). The slice instance #2 includes a second cluster of UP functional nodes.

The illustrated NSSF selects a slice (or instance) that can accommodate the service of the UE.

The illustrated UE may use service #1 through the slice instance #1 selected by the NSSF, and may use service #2 through the slice instance #2 selected by the NSSF.

<Network Slice-Specific Authentication and Authorization>

Meanwhile, for S-NSSAI (Single Network Slice Selection Assistance information), the network slice-specific Authentication and Authorization procedure may be triggered by a Home Public Land Mobile Network (HPLMN) or an Authentication Authorization Accounting (AAA) server provided by a third party that has entered into an agreement with the HPLMN. If the AAA server is provided by a third party, AAA-P (AAA-Proxy) may be used within HPLMN.

This procedure may be triggered during the registration procedure, when some network slices require per-slice authentication and authorization, when the AMF determines that network slice-specific authentication and authorization is required within the currently allowed NSSAI (eg, subscription change), or when the AAA server that authenticated the network slice triggered reauthentication.

AMF may perform Extensible Authentication Protocol (EAP) authentication and communicate through Authentication Server Function (AUSF). AUSF may use any AAA protocol interworking with the AAA protocol supported by the AAA server.

Figure 9A:
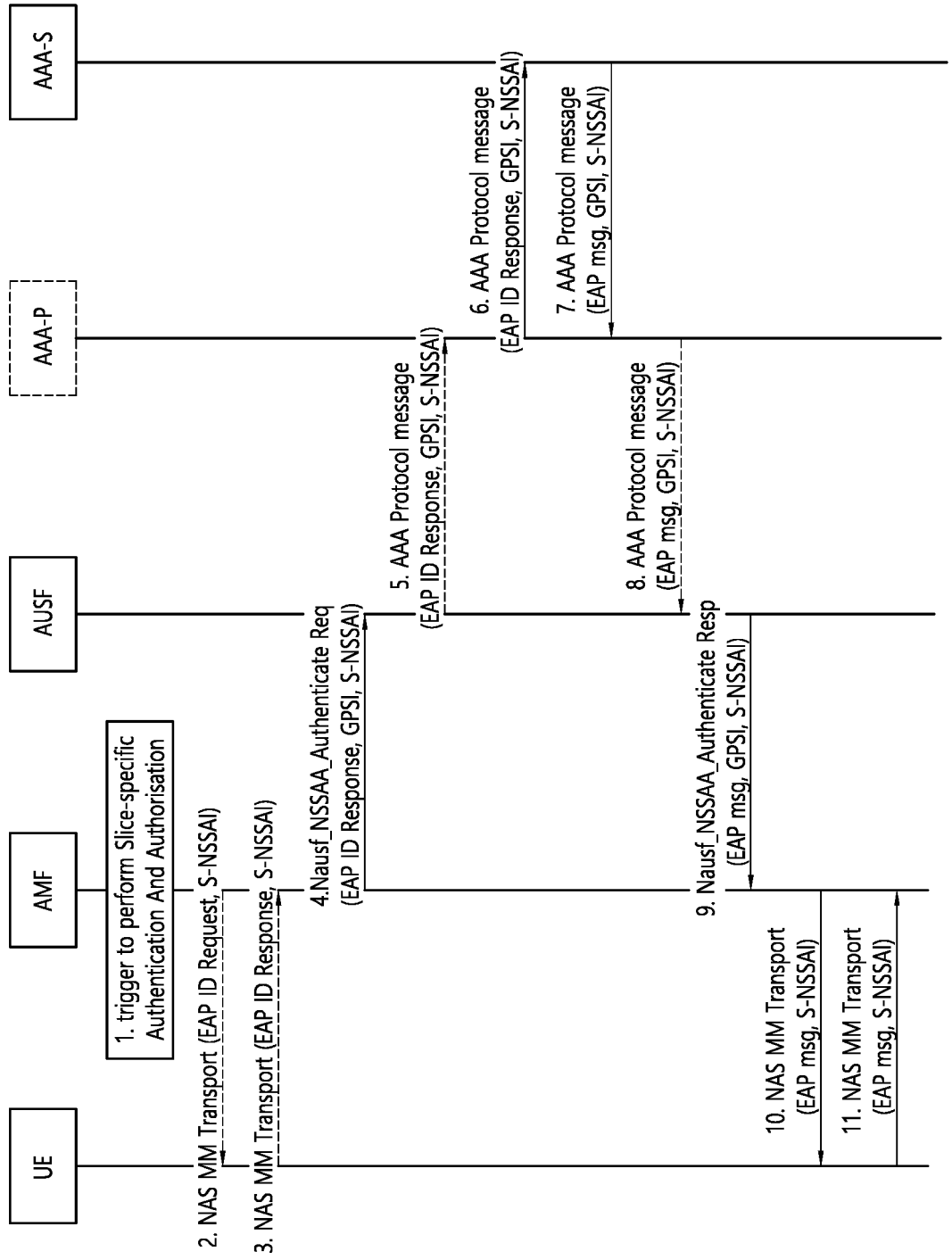

FIGS. 9a and 9b are flowcharts illustrating a network slice-specific authentication and authorization procedure.

1) For S-NSSAI requiring network slice-specific authentication and authorization, based on a change in subscriber information or triggering of an AAA server (ie, AAA-S), AMF may trigger initiation of network slice-specific authentication and authorization procedure.

When network slice-specific authentication and authorization is triggered as a result of the registration procedure, based on the UE context in the AMF, for all or some of the S-NSSAIs subject to network slice-specific authentication and authorization, the AMF may determine that the UE is already authenticated in the registration procedure on the first access. Based on success or failure as a result of performing network slice-specific authentication and authorization during the previous registration procedure, and based on the network policy, the AMF may decide to skip network slice-specific authentication and authorization for these S-NSSAIs, during the registration procedure on the second access.

The AMF may select an access type to be used to perform network slice-specific authentication and authorization procedures based on network policy, when network slice-specific authentication and authorization procedures are triggered as a result of UE reauthentication and re-authentication procedures triggered by the AAA server (ie, AAA-S) for one or more S-NSSAIs, when the network slice-specific authentication and authorization procedure is triggered based on an AMF-based operator policy or subscriber change, or when S-NSSAIs that require network slice-specific authentication and authorization are included in the allowed NSSAI for each access type.

2) AMF may transmit the NAS MM Transport message including the S-NSSAI, by including the EAP identifier request for S-NSSAI in the NSAS MM Transport message. This is the S-NSSAI of the H-PLMN, and may not be an internally mapped S-NSSAI value.

3) The UE may provide an EAP identifier response for S-NSSAI together with S-NSSAI in the NAS MM Transport message.

4) The AMF may transmit the Nausf_NSSAA_Authenticate request (including the EAP identifier response, AAA server (ie, AAA-S) address, GPSI, and S-NSSAI), by including the EAP identifier response in the Nausf_NSSAA_Authenticate request.

5) When AAA-P is provided (eg, because the AAA server (ie, AAA-S) is provided by a third party and the operator has placed a proxy for the third party), AUSF forwards the EAP ID response message to AAA-P. Otherwise, the AUSF directly forwards the message to the AAA server (ie, AAA-S). For AAA-P or AAA servers (ie AAA-S), AUSF may use the AAA protocol message of the same protocol as the protocol provided by the AAA server (ie, AAA-S).

6) AAA-P forwards the EAP Identity message together with the AAA server (ie, AAA-S) address to the AAA server (ie, AAA-S) addressable by S-NSSAI and GPSI (Generic Public Subscription Identifier).

7-14) EAP messages are exchanged with the UE.

15) EAP authentication is completed. The AAA server (ie, AAA-S) stores the authorized S-NSSAI and decides to trigger re-authentication and re-authentication based on the internal policy. EAP success/failure messages are forwarded to AAA-P with GPSI and S-NSSAI.

16) When AAA-P is used, AAA-P sends AAA protocol message including EAP success/failure, S-NSSAI, GPSI to AUSF.

17) AUSF transmits an ausfNSSAA_Authenticate response including EAP success/failure, S-NSSAI, and GPSI to the AMF.

18) AMF transmits a NAS MM Transport message including EAP success/failure to the UE.

19) When an allow NSSAI or a reject NSSAI needs to be delivered to the UE, or when AMF reassignment is required, the AMF may initiate a UE configuration update procedure for each access type. If the network slice-specific authentication and authorization fails for all S-NSSAIs in the allowed NSSAI, the AMF performs a network-initiated deregistration procedure, and the AMF may transmit deregistration request message including a list of the rejected S-NSSAI and the appropriate cause value of rejection.

II. Problems to be Solved by the Disclosure of the Present Specification

In a mobile communication system to which network slicing is applied, a specific network slice may not be able to serve a terminal due to various issues (Example: overload of network slices, limiting the number of serving terminals/number of PDU sessions according to slice management policy, etc.). In this case, the network may transmit a rejection message to the terminal. In this case, the network may transmit information such as a back-off timer to the terminal together with a rejection message in order to limit the re-request of the terminal. When the network transmits a rejection message to a plurality of terminals, by distributing the back-off time value for each of the plurality of terminals, the network may use a technique of distributing the requests of the terminals from the point of view of the entire network.

An example in which the network transmits a rejection message when the network slice fails to serve the UE will be described with reference to the examples of FIGS. 10a and 10b.

Figure 10A:
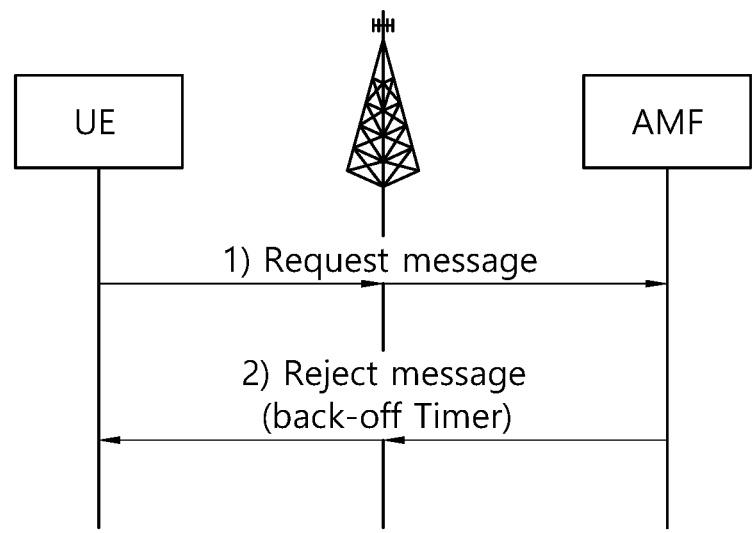
FIGS. 10a and 10b show examples of operations performed by the network when the network slice fails to serve the UE.
Figure 10B:
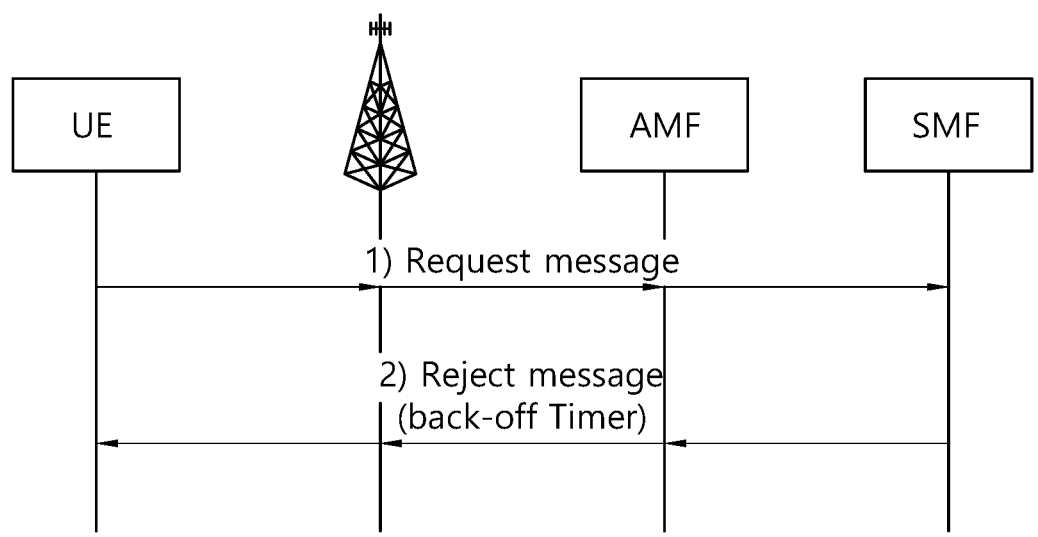

FIGS. 10a and 10b show examples of operations performed by the network when the network slice fails to serve the UE.

Referring to FIG. 10a, a UE, a base station (an object shown between the UE and the AMF), and an AMF are illustrated.

1) The UE may send a request message to the network. For example, the UE may send a registration request message to the AMF.

2) A network slice serving the UE may not serve the UE for a specific reason (Example: overload of network slices, limiting the number of serving terminals/number of PDU sessions according to slice management policy, etc.). In this case, the AMF may transmit a rejection message rejecting the request message to the UE. Here, in order to prevent the UE from immediately re-transmitting the request message for the same network slice, the AMF may include information on the back-off timer in the rejection message.

Referring to FIG. 10b, a UE, a base station (an object shown between the UE and the AMF), an AMF, and an SMF are illustrated.

1) The UE may send a request message to the network. For example, the UE may transmit a PDU session establishment request message to the AMF.

2) The network slice serving the UE may not be able to serve the UE due to a specific reason (eg, overload of the network slice, limitation of the number of serving terminals/number of PDU sessions according to the slice management policy). In this case, the SMF may transmit a rejection message for rejecting the request message to the UE. Here, the SMF may include information on the back-off timer in the rejection message to prevent the UE from immediately retransmitting the request message for the same network slice.

However, the conventional method in which a rejection message is transmitted to the terminal in a batch when the network slice cannot serve the terminal has a problem in that efficient communication is impossible. For example, when looking at the position of the terminal and/or the service received by the terminal, consideration of the requested service of the terminal or the will/preference of the terminal user is insufficient. Due to this, flexibility in the provision of various 5G industries/services may be reduced.

For example, regardless of the situation (eg, when network resources are insufficient, when the terminal cannot access the network slice according to policy, when $3^{rd}$ party authentication is required, etc.) in which the network slice cannot serve the terminal, rejection message is transmitted to the terminal. For this reason, there is a problem that efficient communication is impossible.

For example, even when a network slice is temporarily unavailable, since a rejection message is unconditionally transmitted to the terminal, flexibility in providing a service to the terminal may be reduced. In addition, even if the network slice cannot be accessed, the terminal may need to communicate with the network including the corresponding network slice, but since only a rejection message is transmitted conventionally, the terminal and the network could not communicate.

<Device to which the Disclosure of the Present Specification can be Applied>

Hereinafter, an apparatus to which the disclosure of the present specification can be applied will be described.

Figure 11:
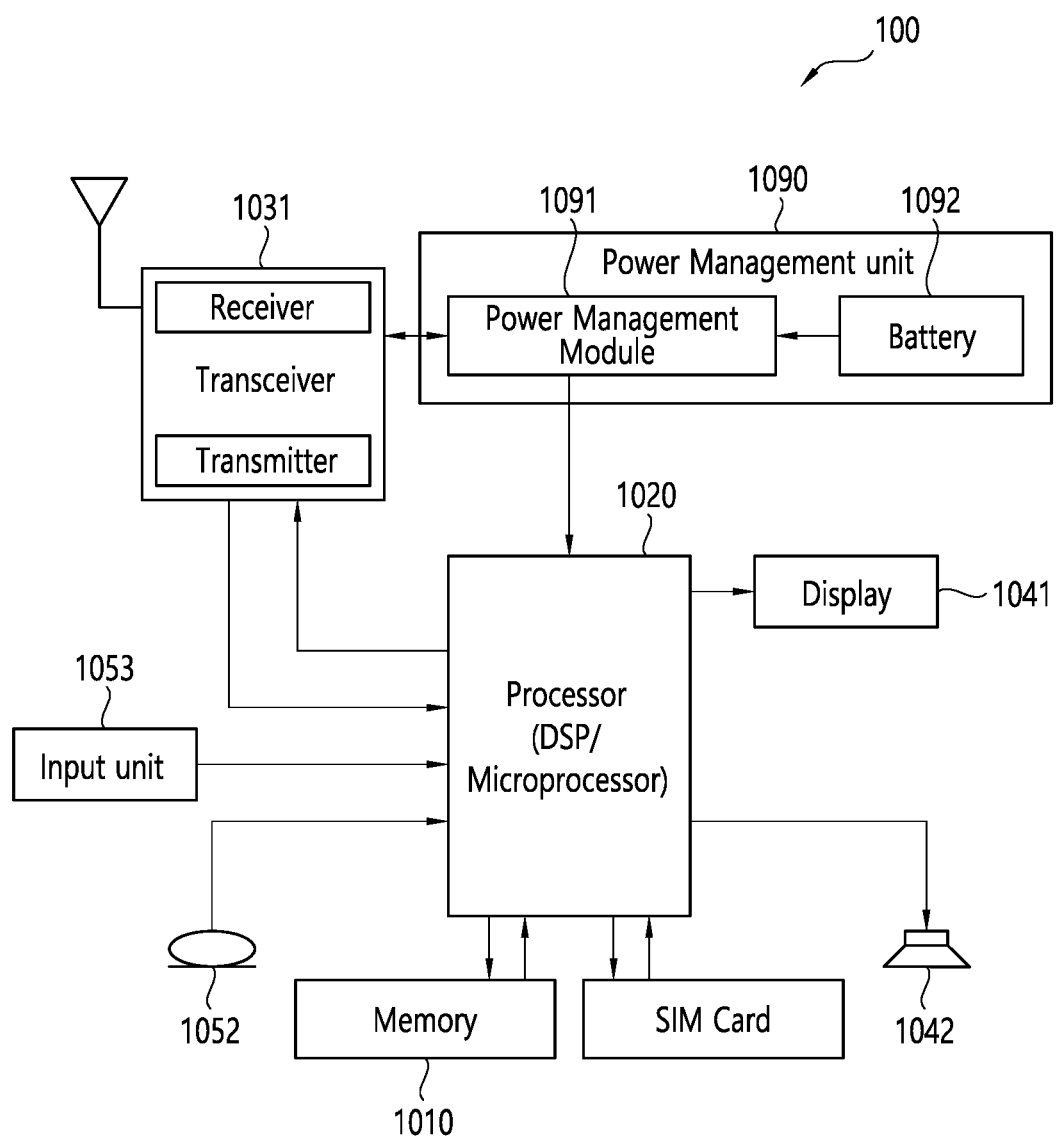
FIG. 11 is a block diagram illustrating a configuration of a UE according to an embodiment.

FIG. 11 is a block diagram illustrating a configuration of a UE according to an embodiment.

As can be seen with reference to FIG. 11, a UE includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

Figure 26:
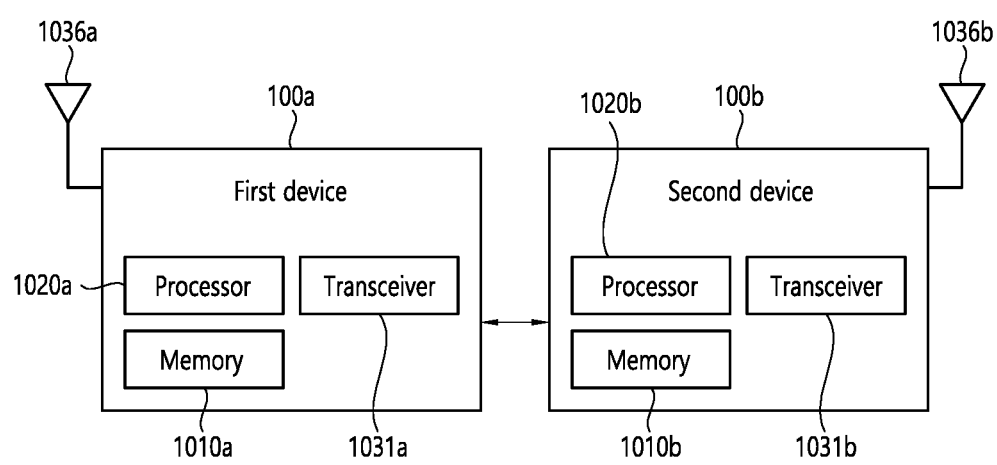
FIG. 26 illustrates a wireless communication system according to an embodiment.

In particular, the UE 100 shown in FIG. 11 is a diagram illustrating the first device of FIG. 26 in more detail.

The processor 1020 may be configured to implement the proposed function, process and/or method described in the present disclosure. Layers of a wireless interface protocol may be implemented in the processor 1020. The processor 1020 may include application-specific integrated circuit (ASIC), other chipset, logical circuit and/or data processing apparatus. The processor 1020 may be an application processor (AP). The processor 1020 may include at least one of a digital signal processor (DSP), a central processing unit (CPU), a graphics processing unit (GPU) and a modulator and demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store international mobile subscriber identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include read-only memory (ROM), random access memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 12:
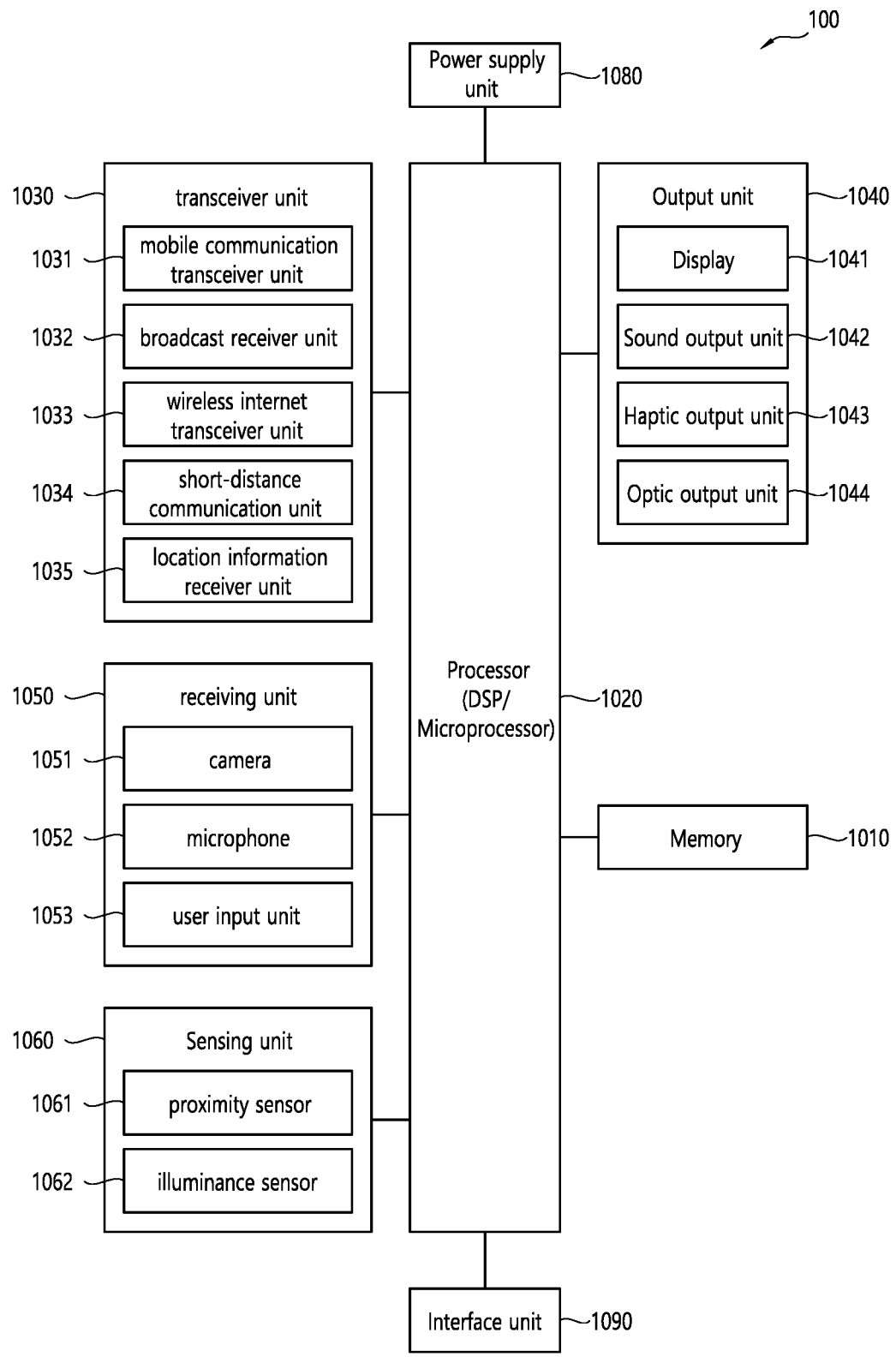
FIG. 12 is a block diagram showing the configuration of the terminal shown in FIG. 11 in more detail.

FIG. 12 is a block diagram showing the configuration of the terminal shown in FIG. 11 in more detail.

The terminal 100 may include a transceiver unit 1030, a processor 1020, a memory 1030, a sensing unit 1060, an output unit 1040, an interface unit 1090, an input unit 1050, and a power supply unit 1080, etc. Since the components shown in FIG. 12 are not essential for implementing the terminal, the terminal described in this specification may have more or fewer components than those listed above.

More specifically, among the components, the transceiver 1030 include one or more modules that enable wireless communication between the terminal 100 and the wireless communication system, between the terminal 100 and another terminal 100, or between the terminal 100 and an external server. In addition, the transceiver 1030 may include one or more modules for connecting the terminal 100 to one or more networks.

The transceiver 1030 may include at least one of a broadcast receiver 1032, a mobile communication transceiver 1031, a wireless Internet transceiver 1033, a short-range communication unit 1034, and a location information module 1150.

The input unit 1050 includes a camera 1051 or an image input unit for inputting an image signal, a microphone 1052 or an audio input unit for inputting an audio signal, and a user input unit 1053 for receiving information from a user, for example, a touch key, a push key (mechanical key), etc.

The voice data or image data collected by the input unit 1050 may be analyzed and processed as a user's control command.

The sensing unit 1060 may include one or more sensors for sensing at least one of information in the mobile terminal, surrounding environment information surrounding the mobile terminal, and user information. For example, the sensing unit 1060 may include a proximity sensor 1061, an illumination sensor 1062, an illumination sensor, a touch sensor, an acceleration sensor, a magnetic sensor, gravity Sensor (G-sensor), gyroscope sensor, motion sensor, RGB sensor, infrared sensor (IR sensor: infrared sensor), fingerprint sensor (finger scan sensor), ultrasonic sensor, optical sensors (eg, cameras (see 1051)), microphones (see 1052), battery gauges, environmental sensors (eg, barometers, hygrometers, thermometers, radiation sensors, It may include at least one of a thermal sensor, a gas sensor, etc.) and a chemical sensor (eg, an electronic nose, a healthcare sensor, a biometric sensor, etc.). Meanwhile, the mobile terminal disclosed in the present specification may combine and utilize information sensed by at least two or more of these sensors.

The output unit 1040 is for generating an output related to visual, auditory or tactile sense, the output unit 1040 may include at least one of a display unit 1041, a sound output unit 1042, a haptip output unit 1043, and an optical output unit 1044. The display unit 1041 may implement a touch screen by forming a layer structure with the touch sensor each other or integrally formed with the touch sensor. Such a touch screen may function as a user input unit 1053 that provides an input interface between the terminal 100 and a user, and may provide an output interface between the terminal 100 and a user.

The interface unit 1090 serves as a passage with various types of external devices connected to the terminal 100. This interface unit 1090 may include at least one of a wired/wireless headset port (port), an external charger port (port), a wired/wireless data port (port), a memory card (memory card) port, a port connecting a device equipped with an identification module, an audio input/output (I/O) port, a video input/output (I/O) port, and an earphone port. Corresponding to the connection of the external device to the interface unit 1090, the terminal 100 may perform appropriate control related to the connected external device.

In addition, the memory 1030 stores data supporting various functions of the terminal 100. The memory 1030 may store a plurality of application programs (or applications) driven in the terminal 100, data for operation of the terminal 100, and commands. At least some of these application programs may be downloaded from an external server through wireless communication. Also, at least some of these application programs may exist on the terminal 100 from the time of shipment for basic functions (eg, functions for incoming calls, outgoing functions, message reception, and message outgoing functions) of the terminal 100. Meanwhile, the application program may be stored in the memory 1030, installed on the terminal 100, and driven by the processor 1020 to perform an operation (or function) of the mobile terminal.

The processor 1020 generally controls the overall operation of the terminal 100 in addition to the operation related to the application program. The processor 1020 may provide or process appropriate information or functions to a user by processing signals, data, information, etc. input or output through the above-described components or by driving an application program stored in the memory 1030.

In addition, the processor 1020 may control at least some of the aforementioned components in order to drive an application program stored in the memory 1030. Furthermore, the processor 1020 may operate by combining at least two or more of the components included in the terminal 100 to drive the application program.

The power supply unit 1080 receives external power and internal power under the control of the processor 1020 to supply power to each component included in the terminal 100. The power supply unit 1080 includes a battery, and the battery may be a built-in battery or a replaceable battery.

At least some of the respective components may operate in cooperation with each other to implement an operation, control, or control method of a mobile terminal according to various embodiments to be described below. In addition, the operation, control, or control method of the mobile terminal may be implemented on the mobile terminal by driving at least one application program stored in the memory 1030.

Hereinafter, before looking at various embodiments implemented through the terminal 100 as described above, the above-listed components will be described in more detail with reference to the drawings.

First, referring to the transceiver 1030, the broadcast receiver 1032 of the transceiver 1030 receives a broadcast signal and/or broadcast related information from an external broadcast management server through a broadcast channel. The broadcast channel may include a satellite channel and a terrestrial channel. Two or more of the broadcast reception modules may be provided to the mobile terminal 100 for simultaneous broadcast reception or broadcast channel switching for at least two broadcast channels.

The mobile communication transceiver 1031 transmit and receive wireless signal with at least one of a base station, an external terminal, and a server on a mobile communication network constructed according to the technical standards or communication methods for mobile communication (eg, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), LTE-A (Long Term Evolution-Advanced), 3GPP NR (New Radio access technology), etc.).

The wireless signal may include various types of data according to transmission and reception of a voice call signal, a video call signal, or a text/multimedia message.

The wireless Internet transceiver 1033 refers to a module for wireless Internet access, and may be built-in or external to the terminal 100. The wireless Internet transceiver 1033 is configured to transmit and receive wireless signals in a communication network according to wireless Internet technologies.

As wireless Internet technologies, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), High Speed Downlink Packet Access (HSDPA), High Speed Uplink Packet Access (HSUPA), Long Term Evolution (LTE), Long Term Evolution-Advanced (LTE-A), 3GPP NR, and the like, and The Internet transceiver 1033 transmits and receives data according to at least one wireless Internet technology within a range including Internet technologies not listed above.

From the point of view that wireless Internet access by WiBro, HSDPA, HSUPA, GSM, CDMA, WCDMA, LTE, LTE-A, 3GPP NR, etc, is made through a mobile communication network, the wireless Internet transceiver 1033 performing wireless Internet access through the mobile communication network may be understood as a type of the mobile communication transceiver 1031.

The short-range communication unit 1034 is for short-range communication, and may support short-distance communication by using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, and Wireless USB (Wireless Universal Serial Bus) technologies. The short-distance communication unit 1034 may support wireless communication between the terminal 100 and the wireless communication system, between the terminal 100 and the other terminal 100, or between the terminal 100 and another network in which the other terminal (1000, or external server) is located. The local area network may be wireless personal area networks.

Here, the other terminal 100 is a wearable device capable of exchanging (or interworking) data with the terminal 100 according to the present specification, for example, a smart watch, a smart glass, neckband, HMD (head mounted display). The short-range communication unit 1034 may detect (or recognize) a wearable device capable of communicating with the terminal 100 in the vicinity of the terminal 100. Furthermore, when the detected wearable device is a device authenticated to communicate with the terminal 100 according to the present specification, the processor 1020 transmits at least a portion of data processed by the terminal 100 to a wearable device through the short-range communication unit 1034. It can be transmitted. Accordingly, the user of the wearable device may use data processed by the terminal 100 through the wearable device. For example, according to this, when a call is received in the terminal 100, it is possible for the user to perform a phone call through the wearable device, or when a message is received in the terminal 100, it is possible for the user to receive the received message through the wearable device.

Furthermore, screen mirroring with a TV located in the house or a display inside a car is performed through the short-distance communication unit 1034, and a corresponding function is performed based on, for example, the MirrorLink or Miracast standard. In addition, it is also possible to directly control a TV or a display inside a vehicle by using the terminal 100.

The location information module 1150 is a module for acquiring a location (or current location) of a mobile terminal, and a representative example thereof includes a Global Positioning System (GPS) module or a Wireless Fidelity (WiFi) module. For example, if the mobile terminal utilizes a GPS module, it can acquire the location of the mobile terminal by using a signal transmitted from a GPS satellite. As another example, if the mobile terminal utilizes the Wi-Fi module, the location of the mobile terminal may be obtained based on information of the Wi-Fi module and a wireless access point (AP) that transmits or receives a wireless signal. If necessary, the location information module 1150 may perform any function of the other modules of the transceiver 1030 to obtain data on the location of the mobile terminal as a substitute or additionally. The location information module 1150 is a module used to obtain the location (or current location) of the mobile terminal, and is not limited to a module that directly calculates or obtains the location of the mobile terminal.

Each of the broadcast receiver 1032, the mobile communication transceiver 1031, the short-range communication unit 1034, and the location information module 1150 may be implemented as a separate module performing a corresponding function, and functions corresponding to two or more of the transceiver 1031, the short-range communication unit 1034, and the location information module 1150 may be implemented by one module.

Next, the input unit 1050 is for inputting image information (or signal), audio information (or signal), data, or information input from a user, for input of image information, the terminal 100 may be provided with one or a plurality of cameras 1051. The camera 1051 processes an image frame such as a still image or a moving image obtained by an image sensor in a video call mode or a photographing mode. The processed image frame may be displayed on the display unit 1041 or stored in the memory 1030. On the other hand, the plurality of cameras 1051 provided in the terminal 100 may be arranged to form a matrix structure, and through the cameras 1051 forming the matrix structure as described above, image information may be input to the terminal 100 has a plurality of cameras having various angles or focal points. In addition, the plurality of cameras 1051 may be arranged in a stereo structure to acquire a left image and a right image for realizing a stereoscopic image.

The microphone 1052 processes an external sound signal as electrical voice data. The processed voice data may be utilized in various ways according to a function (or a running application program) being performed by the terminal 100. Meanwhile, various noise removal algorithms for removing noise generated in the process of receiving an external sound signal may be implemented in the microphone 1052.

The user input unit 1053 is for receiving information from a user, and when information is input through the user input unit 1053, the processor 1020 may control the operation of the terminal 100 to correspond to the input information. The user input unit 1053 is a mechanical input means (or a mechanical key, for example, a button located on the front, rear or side of the terminal 100, a dome switch, a jog wheel, a jog switch, etc.) and a touch input means. As an example, the touch input means consists of a virtual key, a soft key, or a visual key displayed on the touch screen through software processing, or consists of a touch key (touch key) disposed on a part other than the touch screen. On the other hand, the virtual key or the visual key, is possible to be displayed on the touch screen while having various forms, for example, graphic, text, icon, video or a combination of these forms.

Meanwhile, the sensing unit 1060 senses at least one of information in the mobile terminal, surrounding environment information surrounding the mobile terminal, and user information, and generates a sensing signal corresponding thereto. The processor 1020 may control the driving or operation of the terminal 100 or perform data processing, functions, or operations related to an application program installed in the terminal 100 based on the sensing signal. Representative sensors among various sensors that may be included in the sensing unit 1060 will be described in more detail.

First, the proximity sensor 1061 refers to a sensor that detects the presence or absence of an object approaching a predetermined detection surface or an object existing in the vicinity without mechanical contact using the force of an electromagnetic field or infrared rays. The proximity sensor 1061 may be disposed in an inner region of the mobile terminal covered by the touch screen described above or in the vicinity of the touch screen.

Examples of the proximity sensor 1061 include a transmission type photoelectric sensor, a direct reflection type photoelectric sensor, a mirror reflection type photoelectric sensor, a high frequency oscillation type proximity sensor, a capacitive type proximity sensor, a magnetic type proximity sensor, an infrared proximity sensor, and the like. In the case where the touch screen is capacitive, the proximity sensor 1061 may be configured to detect the proximity of an object having conductivity as a change in an electric field according to the proximity of the object. In this case, the touch screen (or touch sensor) itself may be classified as a proximity sensor.

On the other hand, for convenience of description, the act of approaching an object on the touch screen without being in contact so that the object is recognized that it is located on the touch screen is called "proximity touch", and the act of actually touching an object on the screen is called "contact touch". The position where the object is touched in proximity on the touch screen means a position where the object is perpendicular to the touch screen when the object is touched in proximity. The proximity sensor 1061 may detect a proximity touch and a proximity touch pattern (eg, proximity touch distance, proximity touch direction, proximity touch speed, proximity touch time, proximity touch position, proximity touch movement state, etc.). On the other hand, the processor 1020 processes data (or information) corresponding to the proximity touch operation and the proximity touch pattern detected through the proximity sensor 1061 as above, and further, print visual information corresponding to the processed data on the touch screen. Furthermore, the processor 1020 may control the terminal 100 to process different operations or data (or information) according to whether a touch to the same point on the touch screen is a proximity touch or a contact touch.

The touch sensor detects a touch (or touch input) applied to the touch screen (or the display unit 1041) using at least one of various touch methods such as a resistive film method, a capacitive method, an infrared method, an ultrasonic method, and a magnetic field method, etc.

As an example, the touch sensor may be configured to convert a change in pressure applied to a specific part of the touch screen or a change in capacitance occurring in a specific part of the touch screen into an electrical input signal. The touch sensor may be configured to detect a position in which a touch object applying a touch on the touch screen, an area, a pressure at the time of touch, an electrostatic capacitance at the time of touch, etc. Here, the touch object is an object that applies a touch to the touch sensor, and may be, for example, a finger, a touch pen or a stylus pen, a pointer, or the like.

As such, when there is a touch input to the touch sensor, a signal(s) corresponding thereto is sent to the touch controller. The touch controller processes the signal(s) and then sends the corresponding data to the processor 1020. Accordingly, the processor 1020 may know which area of the display unit 1041 has been touched, and the like. Here, the touch controller may be a component separate from the processor 1020, or may be the processor 1020 itself.

Meanwhile, the processor 1020 may perform different controls or may perform the same control according to the type of the touch object that touches the touch screen (or a touch key provided other than the touch screen). Whether to perform different control or the same control according to the type of the touch object may be determined according to the current operating state of the terminal 100 or a running application program.

On the other hand, the touch sensor and the proximity sensor described above are independently or in combination, may sense various types of touch such as, a short (or tap)

touch, a long touch, a multi touch, and a drag touch, flick touch, pinch-in touch, pinch-out touch, swype touch, hovering touch, etc.

The ultrasonic sensor may recognize location information of a sensing target by using ultrasonic waves. Meanwhile, the processor 1020 may calculate the position of the wave source based on information sensed by the optical sensor and the plurality of ultrasonic sensors. The position of the wave source may be calculated using the property that light is much faster than ultrasonic waves, that is, the time at which light reaches the optical sensor is much faster than the time at which ultrasonic waves reach the ultrasonic sensor. More specifically, the position of the wave source may be calculated by using a time difference from the time that the ultrasonic wave arrives using light as a reference signal.

On the other hand, the camera 1051 as described in terms of the components of the input unit 1050 includes at least one of a camera sensor (eg, CCD, CMOS, etc.), a photo sensor (or an image sensor), and a laser sensor.

The camera 1051 and the laser sensor may be combined with each other to detect a touch of a sensing target for a 3D stereoscopic image. The photo sensor may be stacked on the display device, and the photo sensor is configured to scan the motion of the sensing target close to the touch screen. More specifically, the photo sensor mounts photo diodes and transistors (TRs) in rows/columns and scans the contents placed on the photo sensors using electrical signals that change according to the amount of light applied to the photo diodes. That is, the photo sensor calculates the coordinates of the sensing target according to the amount of change in light, and through this, location information of the sensing target can be obtained.

The display unit 1041 displays (outputs) information processed by the terminal 100. For example, the display unit 1041 may display execution screen information of an application program driven in the terminal 100 or UI (User Interface) and GUI (Graphic User Interface) information according to the execution screen information.

Also, the display unit 1041 may be configured as a stereoscopic display unit for displaying a stereoscopic image.

A three-dimensional display method such as a stereoscopic method (glasses method), an auto stereoscopic method (glasses-free method), or a projection method (holographic method) may be applied to the stereoscopic display unit.

The sound output unit 1042 may output audio data received from the transceiver 1030 or stored in the memory 1030 in a call signal reception, a call mode or a recording mode, a voice recognition mode, a broadcast reception mode, and the like. The sound output unit 1042 also outputs a sound signal related to a function (eg, a call signal reception sound, a message reception sound, etc.) performed in the terminal 100. The sound output unit 1042 may include a receiver, a speaker, a buzzer, and the like.

The haptic module 1530 generates various tactile effects that the user can feel. A representative example of the tactile effect generated by the haptic output unit 1043 may be vibration. The intensity and pattern of vibration generated by the haptic output unit 1043 may be controlled by a user's selection or setting of a processor. For example, the haptic output unit 1043 may synthesize and output different vibrations or output them sequentially.

In addition to vibration, the haptic output unit 1043 may generate various tactile effects such as a pin arrangement that moves vertically with respect to the contact skin surface, a jet or suction force of air through a nozzle or an inlet, a touch on the skin surface, contact of an electrode, an electrostatic force, effect caused by heat absorption and the effect of reproducing a feeling of coolness and warmth using an element capable of absorbing heat or generating heat, etc.

The haptic output unit 1043 may not only deliver a tactile effect through direct contact, but may also be implemented so that the user can feel the tactile effect through a muscle sensation such as a finger or arm. Two or more haptic output units 1043 may be provided according to the configuration of the terminal 100.

The light output unit 1044 outputs a signal for notifying the occurrence of an event by using the light of the light source of the terminal 100. Examples of the event generated in the terminal 100 may be message reception, call signal reception, missed call, alarm, schedule notification, email reception, information reception through an application, and the like.

The signal output from the optical output unit 1044 is implemented as the mobile terminal emits light of a single color or a plurality of colors toward the front or rear side. The signal output may be terminated when the mobile terminal detects the user's event confirmation.

The interface unit 1090 serves as a passage with all external devices connected to the terminal 100. The interface unit 1090 receives data from an external device, receives power and transmits it to each component inside the terminal 100, or allows data inside the terminal 100 to be transmitted to an external device. For example, a wired/wireless headset port, an external charger port, a wired/wireless data port, a memory card port, a port for connecting a device equipped with an identification module (port), an audio I/O (Input/Output) port, a video I/O (Input/Output) port, an earphone port, etc. may be included in the interface unit 1090.

On the other hand, the identification module is a chip storing various information for authenticating the use authority of the terminal 100, the identification module may include a user identification module (UIM), a subscriber identity module (subscriber identity module; SIM), a universal user authentication module (universal subscriber identity module; USIM) and the like. A device equipped with an identification module (hereinafter, 'identification device') may be manufactured in the form of a smart card. Accordingly, the identification device may be connected to the terminal 100 through the interface unit 1090.

In addition, the interface unit 1090 may be a path through which power from the cradle is supplied to the terminal 100 when the terminal 100 is connected to an external cradle, or a path through which various commands signal input from the cradle by the user transmitted to the terminal 100. Various command signals or the power input from the cradle may be operated as signals for recognizing that the terminal 100 is correctly mounted on the cradle.

The memory 1030 may store a program for the operation of the processor 1020, and may temporarily store input/output data (eg, a phone book, a message, a still image, a moving image, etc.). The memory 1030 may store data related to vibrations and sounds of various patterns output when a touch input is performed on the touch screen.

The memory 1030 may include at least one type of storage medium such as a flash memory type, a hard disk type, a solid state disk type (SSD), a silicon disk drive type (SDD), and a multimedia card micro type), card-type memory (such as SD or XD memory), random access memory (RAM), static random access memory (SRAM), read-only memory (ROM), electrically erasable programmable read-only memory (EEPROM), a programmable read-only memory (PROM), a magnetic memory, a magnetic disk, and an optical disk. The terminal 100 may be operated in relation to a web storage that performs a storage function of the memory 1030 on the Internet.

Meanwhile, as described above, the processor 1020 controls the operation related to the application program and the general operation of the terminal 100 in general. For example, if the state of the mobile terminal satisfies a set condition, the processor 1020 may execute or release a lock state that restricts input of a user's control command to applications.

In addition, the processor 1020 may perform control and processing related to voice calls, data communication, video calls, etc., or perform pattern recognition processing capable of recognizing handwriting input or drawing input performed on the touch screen as text and images, respectively. Furthermore, the processor 1020 may control any one or a plurality of the components described above in combination to implement various embodiments described below on the terminal 100 according to the present specification.

The power supply unit 1080 receives external power and internal power under the control of the processor 1020 to supply power necessary for operation of each component. The power supply unit 1080 includes a battery, and the battery may be a built-in battery configured to be rechargeable, and may be detachably coupled to the terminal body for charging or the like.

In addition, the power supply unit 1080 may include a connection port, and the connection port may be configured as an example of the interface 1090 to which an external charger that supplies power for charging the battery is electrically connected.

As another example, the power supply unit 1080 may be configured to charge the battery in a wireless manner without using the connection port. In this case, power can be transmitted to the power supply unit 1080 uses one or more of an inductive coupling method based on a magnetic induction phenomenon or a resonance coupling method based on an electromagnetic resonance phenomenon from an external wireless power transmitter.

Meanwhile, various embodiments below may be implemented in, for example, a computer-readable recording medium using software, hardware, or a combination thereof.

On the other hand, the mobile terminal can be extended to a wearable device that can be worn on the body beyond the dimension that the user mainly holds in the hand. Such wearable devices include a smart watch, smart glass, and head mounted display (HMD) and the like. Hereinafter, examples of mobile terminals extended to wearable devices will be described.

The wearable device may be configured to be able to exchange (or interwork) data with another terminal 100. The short-range communication unit 1034 may detect (or recognize) a wearable device capable of communicating around the terminal 100. Furthermore, when the detected wearable device is a device authenticated to communicate with the terminal 100, the processor 1020 may transmit at least a portion of data processed in the terminal 100 to the wearable device through the short-range communication unit 1034. Accordingly, the user may use data processed by the terminal 100 through the wearable device. For example, it is possible to perform a phone call through the wearable device when a call is received in the terminal 100, or to check the received message through the wearable device when a message is received to the terminal 100.

Figure 13:
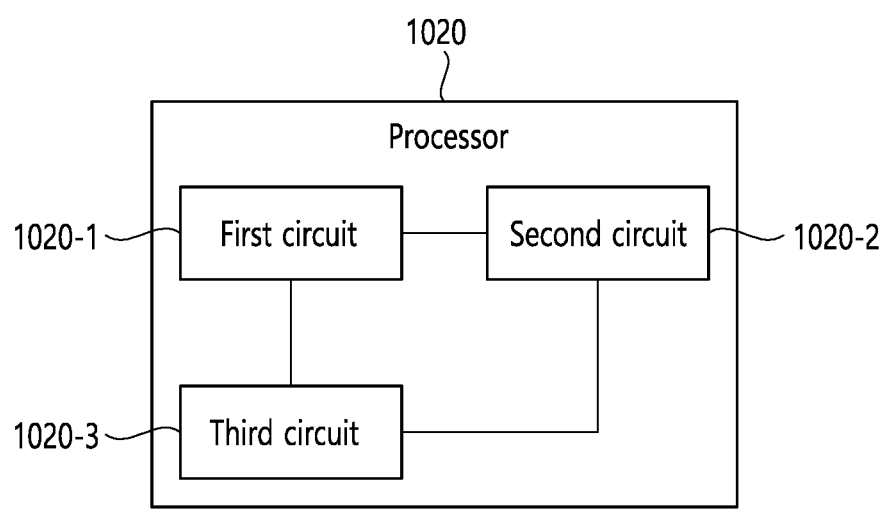
FIG. 13 is a detailed configuration block diagram of the processor shown in FIG. 11 or 12.

FIG. 13 is a detailed configuration block diagram of the processor shown in FIG. 11 or 12.

As can be seen with reference to FIG. 13, a processor 1020 on which the disclosure of this specification is implemented may include a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

III. Disclosure of the Present Specification

The disclosures described below in this specification may be implemented in one or more combinations (eg, a combination including at least one of the contents described below). Each of the drawings shows an embodiment of each disclosure, but the embodiments of the drawings may be implemented in combination with each other.

The description of a method for performing communication related to a network slice proposed in the disclosure of the present specification may consist of a combination of one or more operations/configurations/steps described below.

As described in the disclosure of the present specification, the network node may perform an operation as illustrated in the following example. For example, the network node performing the operation described in the example below may be an AMF. A network node may be described as a network control node.

The network node may exchange information with a network slice metric management node according to an access request of the terminal. In addition, the network node may determine whether the terminal can access a specific network slice.

When the terminal is able to access a specific network slice, the network node may allow access of the terminal according to the prior art.

When it is impossible for the UE to access a specific network slice, the network node may determine whether to temporarily include the UE in the standby network slice (or standby slice). Here, the standby network slice is a temporary network slice used by the terminal to wait until the terminal can access a specific network slice when the terminal cannot access a specific network slice to be accessed due to reasons such as network slice limit control. Here, a case in which it is determined that the terminal cannot be accessed due to the network slice limit control, may mean a state in which there is no problem in factors that determine the terminal's access to the network (eg, terminal authentication, network slice subscription information, etc.) other than the network slice limit, but access is impossible due to a network slice limit. For example, network slice limit control may mean control according to the maximum number of terminals that can access the network slice, the maximum number of PDU sessions that can be established in the network slice, the maximum downlink data rate or the maximum uplink data rate that can be used in the network slice. In this temporary connection state, a normal service cannot be provided, but a control message can be exchanged between the terminal and the network. Based on subscriber information on standby slice availability (e.g., subscriber information related to the availability of standby slice when controlling network slice limit), direct request information of the terminal (eg, request information included in registration request message, PDU session establishment request message, etc.), the current load of the standby slice and/or operator policy, etc, the network node may determine whether to temporarily include the UE in the standby network slice (or standby slice).

When the network node decides to temporarily include the terminal in the standby network slice (or standby slice), the network node may grant a special access of the UE together with temporary permission information (eg, including standby network slice information and/or standby time information, etc.) to the UE. For reference, the standby time information may be included in the standby network slice information. For example, the network node may transmit an Accept message including temporary permission information (eg, including standby network slice information and/or standby time information, etc.) to the terminal.

Here, the special access may mean that the terminal accesses the network and accesses in a state in which the determination of the right to receive the service and the normal access permission are suspended. For example, a special connection may be compared to a connection to receive a service for an emergency call in the prior art. The special connection may mean a state in which the terminal connected through the special connection does not receive the service provided by the network, but the terminal can receive the control message transmitted from the network.

An example of a scenario in which a special access of the terminal is permitted is as follows. 1) In a scenario in which authentication of a 3rd party service provider for the terminal is required in addition to the authentication procedure of the mobile communication system for the terminal, when waiting for an authentication procedure from a 3rd party service provider or when the limit allowed in the network slice (eg, the limit of the number of terminals allowed to access the network slice) is exceeded. 2) When a device (eg, a terminal) that has not received a policy necessary for network access from the network tries to access it for the first time (eg, when the terminal is used for the first time after the production of the terminal, etc).

Note that the name "special access" is only an example, various terms may be used in the same meaning as "special access" to mean that the terminal accesses the network while the judgment on the right to access the network and the normal access permission is pending. For example, terms such as "standby network slice connection" may be used with the same meaning.

When the network node receives a direct request for temporary standby from the terminal (eg, when the terminal transmits a request to temporarily include in the standby network slice when the terminal is impossible to perform network slice access due to the network slice limit control), the network node may manage the standby of the corresponding terminal together with the network slice indicator management node.

When a temporary standby terminal (eg, a terminal temporarily included in a standby network slice) becomes available for access permission to a specific network slice (eg, a network slice to which the terminal is trying to access), the network node confirms the location of the terminal through terminal paging (eg, paging procedure), and the network node may provide the terminal with information permitting the terminal's access (eg, the terminal's actual access to the network slice).

The network slice indicator management node may perform an operation as in the example below. For reference, the network slice indicator management node is a network node that can perform the operations as in the example below, the network slice indicator management node may mean a network node capable of managing indicators related to network slices. For example, a network slice indicator management node may mean a new network node (eg New NF (Network Function) capable of performing NWDAF, NSSF, or a corresponding function (eg, a function to manage indicators related to a network slice)). Here, the new network node is a new network node capable of performing the operation of the network slice indicator management node described below.

Through interaction with network control nodes (eg, network nodes such as AMF), the network slice indicator management node may manage the management metrics set in the network (eg, the management metrics set for the network slice), and may manage a list of standby terminals (eg, standby terminals included in the standby network slice).

The network slice indicator management node may notify a network control node serving a specific terminal from the list of standby terminals of the situation at a time when a set condition is satisfied. For example, when the number of terminals accessing the corresponding network slice managed by the network slice indicator management node decreases and becomes less than the set limit, the network slice indicator management node may perform subsequent operation to fill the network slice limit until the limit in the list of standby terminals is not exceeded based on a first-in-first-out (FIFO) format. The subsequent operation may mean that the network control node performs the procedure of notifying the terminal that it has switched from the standby connection state to the normal connection state, by notifying the network control node serving the terminal that there is room in the network slice limit.

As described in the disclosure of the present specification, a terminal (eg, UE) may perform an operation as illustrated in the following example.

According to the connection request response message from the network control node (eg, a network node such as AMF), the UE may determine whether to accept the temporary standby (eg, the operation of being included in the standby network slice and waiting temporarily) to the standby network slice. For example, based on preset information and/or interaction with the user (eg, interaction with the user through the UI/UX of the terminal), the UE may determine whether to accept the temporary standby to the standby network slice. And, the terminal may transmit a result of determining whether to accept the temporary standby to the network.

The terminal may operate in the standby mode of the temporary network slice. For example, the UE may access (or be included in) the temporary network slice and perform a standby operation. The terminal may wait until an additional permission is received from the network without an additional request (a request to transmit to the network). For example, the terminal may perform prior art operations for reducing power consumption of the terminal while waiting for an additional permission to be received from the network. Conventional techniques for reducing power consumption of the terminal may include, for example, the use of a Mobile Initiated Connection Only (MICO) mode, an extended idle mode Discontinuous Reception (DRX), and the like. For reference, an operation for reducing power consumption according to the prior art is described in detail in 3GPP Technical Specification (TS) 23.501 V16.0.0, 5.31.7 Power Saving Enhancements. For example, a terminal is a device that does not operate in MICO mode under normal circumstances, only when a special connection is permitted, the terminal can operate in MICO mode or use extended idle mode DRX.

Information on whether the terminal will perform any operation to reduce the power consumption of the terminal, may be transmitted to the terminal by being included in information about special access permission (eg, temporary permission information) or an acceptance message, when the network node transmits special access permission information (eg, temporary permission information) to the terminal. Also, as in the prior art, together with values (eg, accepted MICO mode indication, Accepted DRX parameters, extended idle mode DRX parameters, etc.) that the network provides to the terminal to perform an operation to reduce the terminal's power consumption, information on whether to perform an operation to reduce power consumption of the terminal may be transmitted to the terminal.

In a situation where the terminal operates in standby mode, according to an additional user's intention (eg, when the user does not want to wait any longer and provides the terminal with an interaction to end the standby state), the terminal may perform an operation for releasing access to the network. Thereafter, the terminal may perform an operation for selecting another PLMN or a request to another service set, etc. A request to another service set may mean a request to access another network slice.

The network control node may transmit a message allowing access to a specific network slice to the terminal. After the terminal receives a message allowing the network control node to access a specific network slice, the terminal may release the connection with the temporary network slice. After the terminal releases the connection with the temporary network slice, the terminal may perform an operation for reconnection to a desired network slice (eg, a specific network slice). For example, after the terminal releases the connection with the temporary network slice, in order to access a desired network slice, the terminal may transmit a registration request message.

An example of operation of a network node and/or a terminal according to the disclosure of the present specification will be described with reference to the example of FIG. 14.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 14:
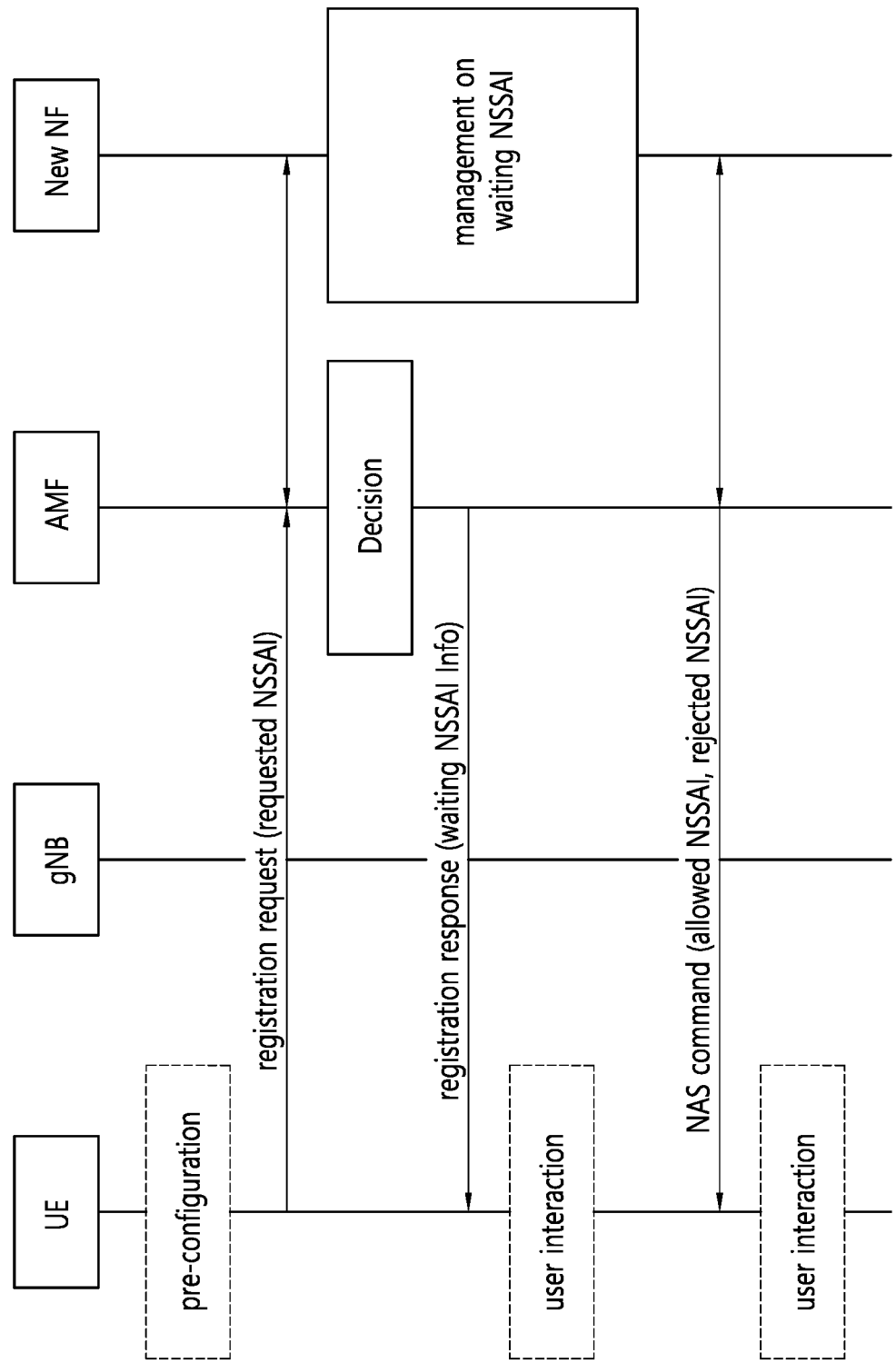
FIG. 14 shows an example of operation of a network node and/or a terminal according to the disclosure of the present specification.

FIG. 14 shows an example of operation of a network node and/or a terminal according to the disclosure of the present specification.

Referring to FIG. 14, a UE (eg, UE), a RAN (eg, gNB), AMF, and New NF are illustrated.

Here, New NF may be an example of a network slice indicator management node. For reference, NWDAF may be used for the network slice indicator management node. The NWDAF may provide network analysis information according to a request of a network function (NF) (eg, AMF, NSSF, etc.). For example, when AMF requests analysis information about the load level of a network slice, the NWDAF may provide the AMF with information on a network slice or information on a standby network. The NWDAF may manage network slices. For reference, the New NF may perform the operation of the NWDAF described above. That is, the New NF may be a new network node capable of performing a function of managing an index related to a network slice.

Although New NF is illustrated in the example of FIG. 14, this is only an example, and as described above, NWDAF or NSSF may perform an operation according to the disclosure of the present specification instead of New NF.

For reference, an operation indicated by a dotted line in the example of FIG. 14 means an operation that may be selectively performed. That is, the operation shown by the dotted line in the example of FIG. 14 may not be performed.

The UE may perform pre-configuration. For example, the terminal may pre-configure information related to the standby network slice. For example, the terminal may be pre-configured with information related to the standby network slice from the user through a user interface/user experience (UI/UX). As another example, the information related to the standby network slice may be information pre-configured in the terminal without interaction with the user. For example, the terminal may be input configuration related to the standby network slice from the user, by displaying a screen such as the example of FIG. 18 or the example of FIG. 19 on the display, The terminal may transmit a registration request message to the AMF. The registration request message may include Requested NSSAI information. That is, the registration request message may include information on a network slice to which the terminal wants to access.

Based on the information about the network slice received from the terminal, the AMF may determine whether a network slice to which the terminal wants to access can provide a service to the terminal. For example, upon receiving a registration request message from the terminal, the AMF may determine whether the UE can access a specific network slice (eg, a network slice to which the UE desires to access) by exchanging information related to the network slice with the New NF. When it is determined that the terminal is accessible to a specific network slice, the AMF may allow the terminal to access to the network slice according to the prior art. In the example of FIG. 14, with respect to a specific network slice, an example in which the terminal is determined to be inaccessible due to network slice limit control will be described. Here, a case in which it is determined that the terminal cannot be accessed due to the network slice limit control, may mean a state in which there is no problem in factors that determine the terminal's access to the network (eg, terminal authentication, network slice subscription information, etc.) other than the network slice limit, but access is impossible due to a network slice limit. For example, network slice limit control may mean control according to the maximum number of terminals that can access the network slice, the maximum number of PDU sessions that can be established in the network slice, the maximum downlink data rate or the maximum uplink data rate that can be used in the network slice.

For a specific network slice, when the AMF determines that the terminal is inaccessible due to network slice limit control as well, the AMF may determine whether to temporarily include the UE in the standby slice. If the AMF decides to temporarily include the terminal in the standby slice, the AMF may transmit a Registration Request response message (eg, a registration acceptance message) to the terminal. The registration request response message transmitted by the AMF may include waiting NSSAI Info (ie, waiting NSSSAI information). The waiting NSSAI Info may refer to the temporary permission information described above. For example, waiting NSSAI Info may include waiting network slice information and/or waiting time information.

Upon receiving the registration request response message including the waiting NSSAI Info, the terminal may determine whether to accept the temporary waiting to the standby network slice. For example, the terminal may determine whether to accept the temporary standby by accessing the standby network slice through pre-configuration or interaction with the user. For example, the terminal may be input information related to the standby network slice from the user, by displaying a screen such as the example of FIG. 18 or the example of FIG. 19 on the display. When the terminal determines to wait by accessing the standby network slice, the terminal may access the temporary network slice and operate in the standby mode. In this case, the terminal may also perform an operation for reducing power consumption of the terminal.

New NF may perform management on waiting NSSAI. For example, AMF and New NF may manage the standby of the terminal together.

Thereafter, a procedure (eg, an authentication procedure of a 3rd party service provider, etc.) related to an example of a scenario in which a special access of the terminal is allowed may be performed. After this procedure is performed, the AMF may transmit a NAS command message to the terminal. The NAS command message may include network slice information allowed to the terminal (eg, allowed NSSAI) and/or rejected network slice information (eg, rejected NSSAI).

The terminal may receive the NAS command message from the AMF. For example, when information on a network slice to which the terminal wants to access is included in allowed network slice information (eg, allowed NSSAI), after releasing the connection to the standby network slice, the UE may perform an operation for accessing the corresponding network slice. In addition, the terminal may provide information related to permitted network slice information (eg, allowed NSSAI) and/or rejected network slice information (eg, rejected NSSAI) to the user through user interaction. For example, the terminal may provide information related to the standby network slice may also to the user, by displaying a screen such as the example of FIGS. 20 to 25 on the display.

In the following, through the first and second examples of the disclosure of the present specification, an example of a specific operation according to a scenario in which a special access of the terminal is allowed will be described. For example, a first example of the disclosure herein may describe 1) in a scenario in which authentication of a 3rd party service provider for the terminal is required in addition to the authentication procedure of the mobile communication system for the terminal, an example of a case in which a 3rd party service provider's authentication procedure is waited or a limit allowed in a network slice (eg, the limit of the number of terminals allowed access to a network slice) is exceeded. A second example of the disclosure of the present specification may describe 2) an example of a case where a device (eg, a terminal) that has not received a policy necessary for network access from the network attempts to access it for the first time (eg, when the corresponding terminal is used for the first time after the production of the terminal).

1. First Example of the Disclosure of the Present Specification

A first example of the disclosure of the present specification an example of waiting for the 3rd party service provider's authentication procedure will be described, in a scenario in which authentication of a 3rd party service provider for the terminal is required in addition to the authentication procedure of the mobile communication system for the terminal.

A first example of a first example of the disclosure of the present specification will be described with reference to FIG. 15.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 15:
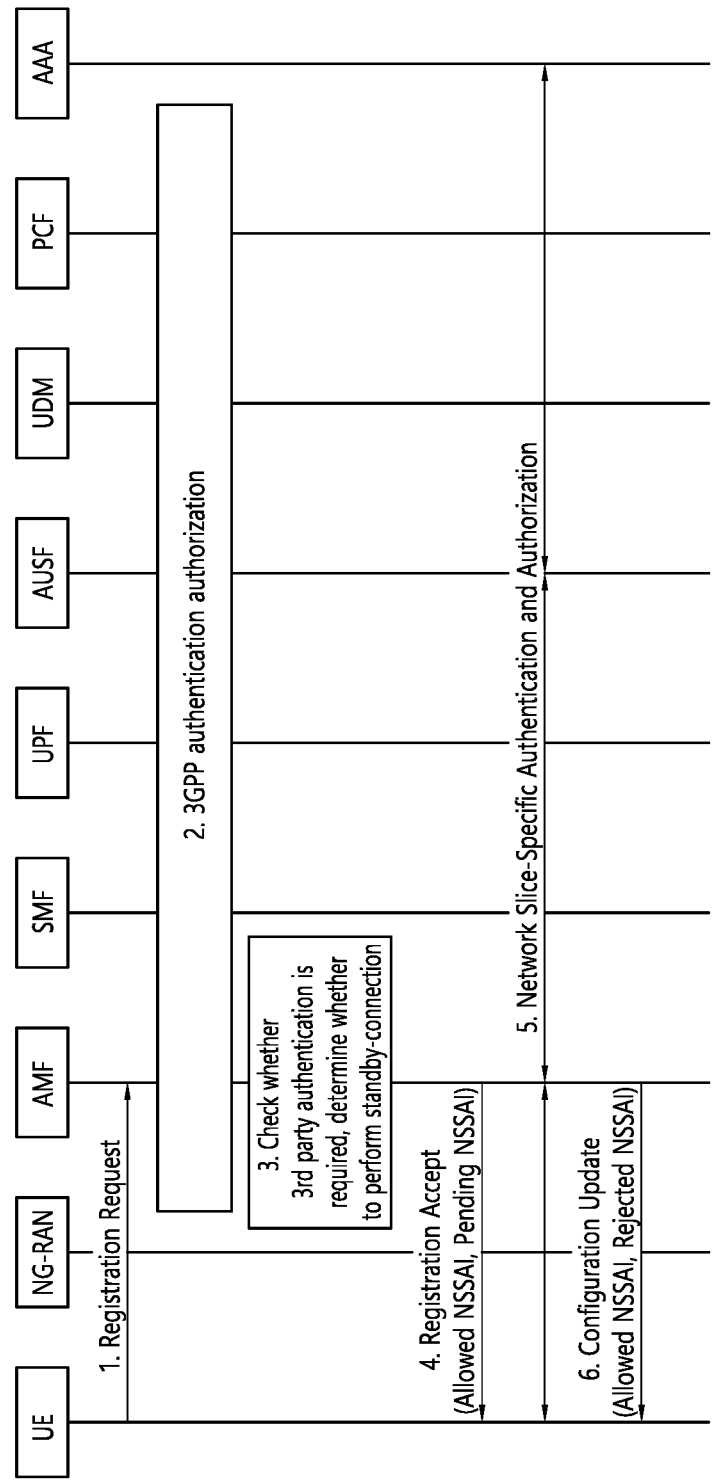
FIG. 15 shows an example of a signal flow diagram according to a first example of a first example of the disclosure of the present specification.

FIG. 15 shows an example of a signal flow diagram according to a first example of a first example of the disclosure of the present specification.

FIG. 15 shows an example of a signal flow diagram in a scenario in which authentication of a 3rd party service provider is performed.

1) A terminal (eg, UE) may request an access to the network. For example, the terminal may transmit a registration request message to the AMF. The registration request message may include network slice information (eg, Requested NSSAI) to which the terminal wants to access.

2) When the AMF receives the registration request message, a registration procedure (eg, the registration procedure described with reference to FIGS. 5*a* and 5*b*) may be performed. In addition, the AMF may perform an authentication procedure (eg, 3GPP authentication/authorization) with other network nodes (eg, SMF, UPF, AUSF, UDM, and/or PCF, etc.).

3) The AMF may check whether 3rd party authentication is required for a specific network slice (eg, a network slice to which the UE wants to access). Whether or not 3rd party authentication for the corresponding network slice is required may be included in subscriber information of the terminal according to the prior art. That is, the AMF may check the subscriber information of the terminal to determine whether 3rd party authentication for a specific network slice is required for the terminal.

4) The network (eg, AMF) may transmit an access permission message to the terminal. For example, the AMF may transmit a registration acceptance message to the terminal. In this case, the registration acceptance message may include permitted network slice information (eg, Allowed NSSAI) and pending network slice information requiring 3rd party authentication (eg, Pending NSSAI). For example, when the network slice information to which the terminal wants to access includes information on a plurality of network slices, the AMF may determine a permitted network slice and a pending network slice requiring 3rd party authentication from among the plurality of network slices.

5) 3rd party authentication procedure may be performed. That is, a network slice-specific authentication and authorization procedure may be performed. For example, the terminal, AMF, AUSF, AAA (Authentication, authorization and accounting), etc. may perform a network slice-specific authentication and authorization procedure.

6) According to the result of the 3rd party authentication procedure performed in step 5), the network (eg, AMF) may transmit allowed network slice information (Allowed NSSAI) and rejected network slice information (Rejected NSSAI) to the UE. For example, the network (eg, AMF) may transmit a Configuration Update message (eg, including allowed network slice information (Allowed NSSAI) and rejected network slice information (Rejected NSSAI)) to the terminal.

Figure 16:
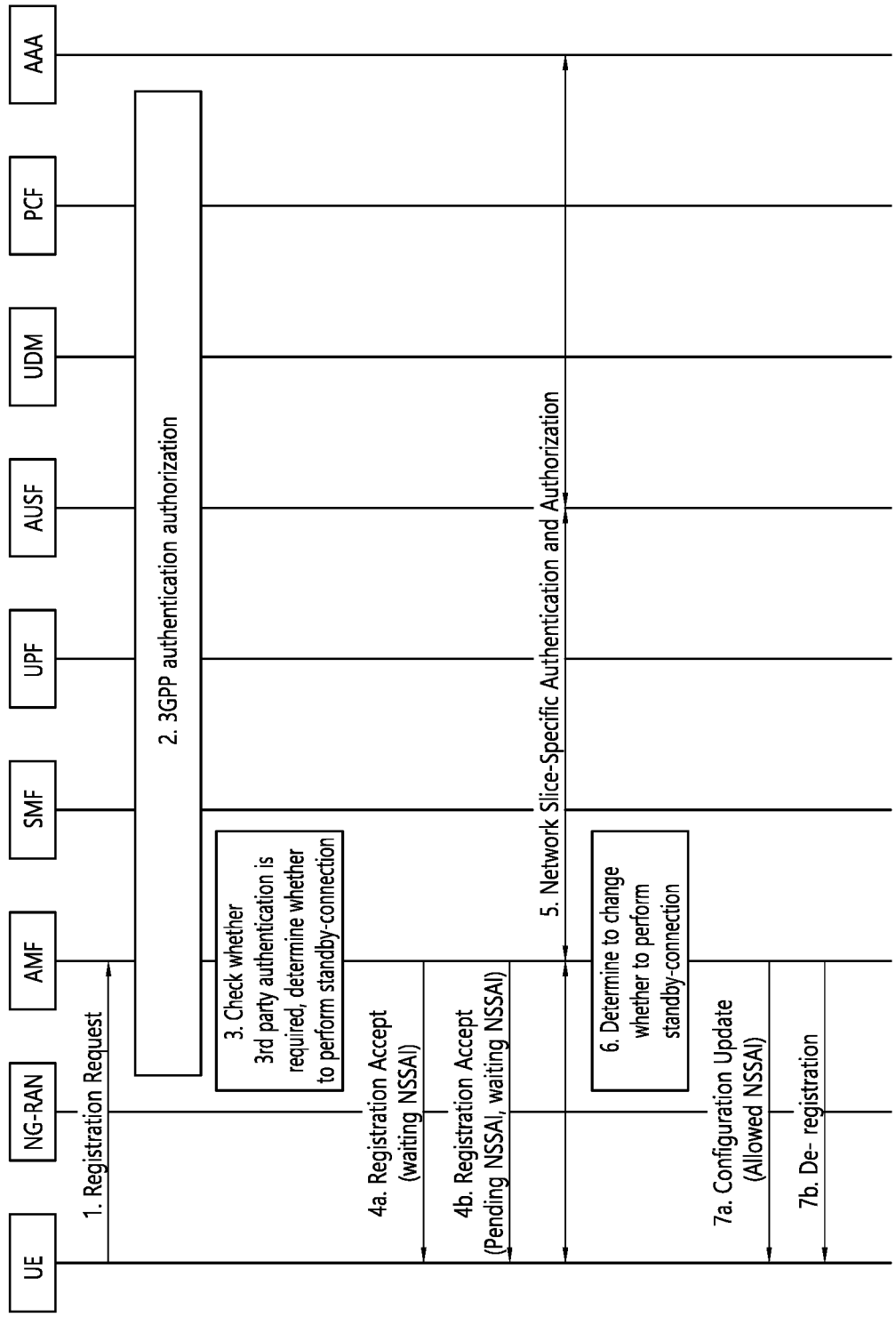
FIG. 16 shows an example of a signal flow diagram according to a second example of a first example of the disclosure of the present specification.

Hereinafter, with reference to FIG. 16, an example of performing standby access (eg, access to a standby network slice) if 3rd party authentication is required will be specifically described. Although the example of FIG. 16, shows an example of performing a connection to a standby network slice when 3rd party authentication is required, in the step of the AMF determining whether a standby connection is needed, the AMF may also determine whether to allow stand-by connection by checking the permission limit, such as the number of terminals allowed for the network slice.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 16 shows an example of a signal flow diagram according to a second example of a first example of the disclosure of the present specification.

1) A terminal (eg, UE) may request an access to the network. For example, the terminal may transmit a registration request message to the AMF. The registration request message may include network slice information (eg, Requested NSSAI) to which the terminal wants to access.

2) When the AMF receives the registration request message, a registration procedure (eg, the registration procedure described with reference to FIGS. 5*a* and 5*b*) may be performed. In addition, the AMF may perform an authentication procedure (eg, 3GPP authentication/authorization) with other network nodes (eg, SMF, UPF, AUSF, UDM, and/or PCF, etc.).

3) The AMF may check whether 3rd party authentication is required for a specific network slice (eg, a network slice to which the UE wants to access). In addition, as the AMF receives the registration request message from the terminal, it exchanges information related to the network slice with the New NF, the AMF may determine whether the terminal can access a specific network slice (eg, a network slice to which the terminal wants to access). When it is determined that the terminal is accessible to a specific network slice, the AMF may provide allowed NSSAI to the UE. When it is determined that the terminal cannot access a specific network slice, the AMF cannot provide allowed NSSAI to the UE. In the example of FIG. 16, with respect to a specific network slice, an example in which the terminal is determined to be inaccessible due to network slice limit control will be described. That is, in the following, the expression "no allowed NSSAI" means that the UE cannot access a specific network due to network slice limit control. Additionally, the AMF may determine whether to connect to standby. For example, the AMF may determine whether to temporarily include the terminal in the standby network slice. That is, the AMF may determine whether to wait by connecting the terminal to the standby network slice.

For example, in the following case, the AMF may determine to connect the terminal to the standby network slice.

A case in which allowing standby access to the terminal according to subscriber information and operator policy, there is no allowed NSSAI (eg, there is no network slice allowed for the terminal among the network slices requested by the terminal), and 3rd party authentication is required for the network slice requested from the terminal.

A case in which allowing standby access to the terminal according to subscriber information and operator policy, there is no allowed NSSAI (eg, there is no network slice allowed for the terminal among the network slices requested by the terminal), and 3rd party authentication is required for the default NSSAI of the terminal's subscriber information.

4) The network may transmit an access permission message to the terminal. For example, the AMF may send a registration accept message according to step 4-a) or step 4-b).

[option 1] 4-a) The AMF may transmit standby network slice information (eg, waiting NSSAI) to the UE without pending NSSAI information. For example, the AMF may transmit a registration acceptance message (including waiting NSSAI) to the terminal. Step 4-a) may be performed when the pending NSSAI information and the standby network slice information (eg, waiting NSSAI) are the same, etc.

[option 2] 4-b) AMF may transmit standby network slice information (eg, waiting NSSAI) to the UE together with pending NSSAI information. For example, the AMF may transmit a registration acceptance message (including a pending NSSAI and a waiting NSSAI) to the UE. Step 4-b) may be performed when there are one or more pending network slices and one or more standby network slices, and NSSAI information and standby network slice information (eg, waiting NSSAI) are different, etc.

When step 4-a) or step 4-b) is performed, the following description may be applied from the viewpoint of the terminal:

When the terminal receives only Pending NSSAI: The UE may be in a state that is not connected to any network slice. The terminal cannot provide a service to the user and may be in a state where it is not controlled by the network. That is, this situation (a situation in which the terminal receives only the Pending NSSAI) may occur when it is not permitted with the subscriber information without information indicating that the terminal uses the Waiting NSSAI.

When the UE receives only the Waiting NSSAI: The UE may access the waiting slice designated by the AMF. While the terminal is connected to the designated standby slice, although the terminal cannot provide services to the user, the terminal may be in a state of being controlled for each network slice from the network. For example, control per network slice controlled by the network is for network management purposes, and may include an application of movement and charging policy of terminals belonging to the entire slice, application of slice-based access control, and/or a policy for reducing power consumption of the terminal.

When the UE receives the Pending NSSAI and the Waiting NSSAI together: The UE may access the designated waiting slice. After that, after the terminal successfully performs the network slice-specific authentication and authorization procedure (eg, the procedure of step 5), when receiving allowed NSSAI from the AMF, the UE needs to determine whether to maintain the standby state or to receive a service based on the allowed NSSAI. For example, in the list of network slices included in the allowed NSSAI received by the terminal, if there is no specific network slice into which the terminal has entered the standby state (ie, a network slice that the terminal wants to receive service), the UE may determine to wait more without receiving the service of another permitted network slice. On the other hand, according to the network implementation or decision by the network, a case in which the AMF transmits the Pending NSSAI and the Waiting NSSAI together to the terminal may not occur (ie, the AMF may be configured to transmit only one of the Pending NSSAI and the Waiting NSSAI).

5) 3rd party authentication procedure may be performed. That is, a network slice-specific authentication and authorization procedure may be performed. For example, a terminal, AMF, AUSF, AAA, etc. may perform a network slice-specific authentication and authorization procedure.

6) AMF may determine whether it is necessary to change the standby connection status. For example, the AMF may examine whether it is necessary to change the standby connection state of the terminal. When the AMF receives a notification that the number of managed access terminals has decreased below the network limit from the network node in charge of network limit control (eg New NF, NSSFN, NWDAF, etc.), or when the AMF receives a notice that the network limit itself is increased due to operator policy and a larger number of terminals can be accommodated, the AMF needs to change the standby connection state of the terminal.

7-a or 7-b) According to the results of steps 5) and 6) described above (eg, the result of 3rd party authentication procedure), the network may transmit a message for updating network slice information or releasing terminal access to the terminal. For example, in step 7-a), if 3rd party authentication is successful, the AMF may transmit a Configuration Update message (including Allowed NSSAI information) to the UE. For another example, in step 7-b), if 3rd party authentication fails, in order to release the connection of the terminal, the AMF may transmit a de-registration request message to the terminal.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 17:
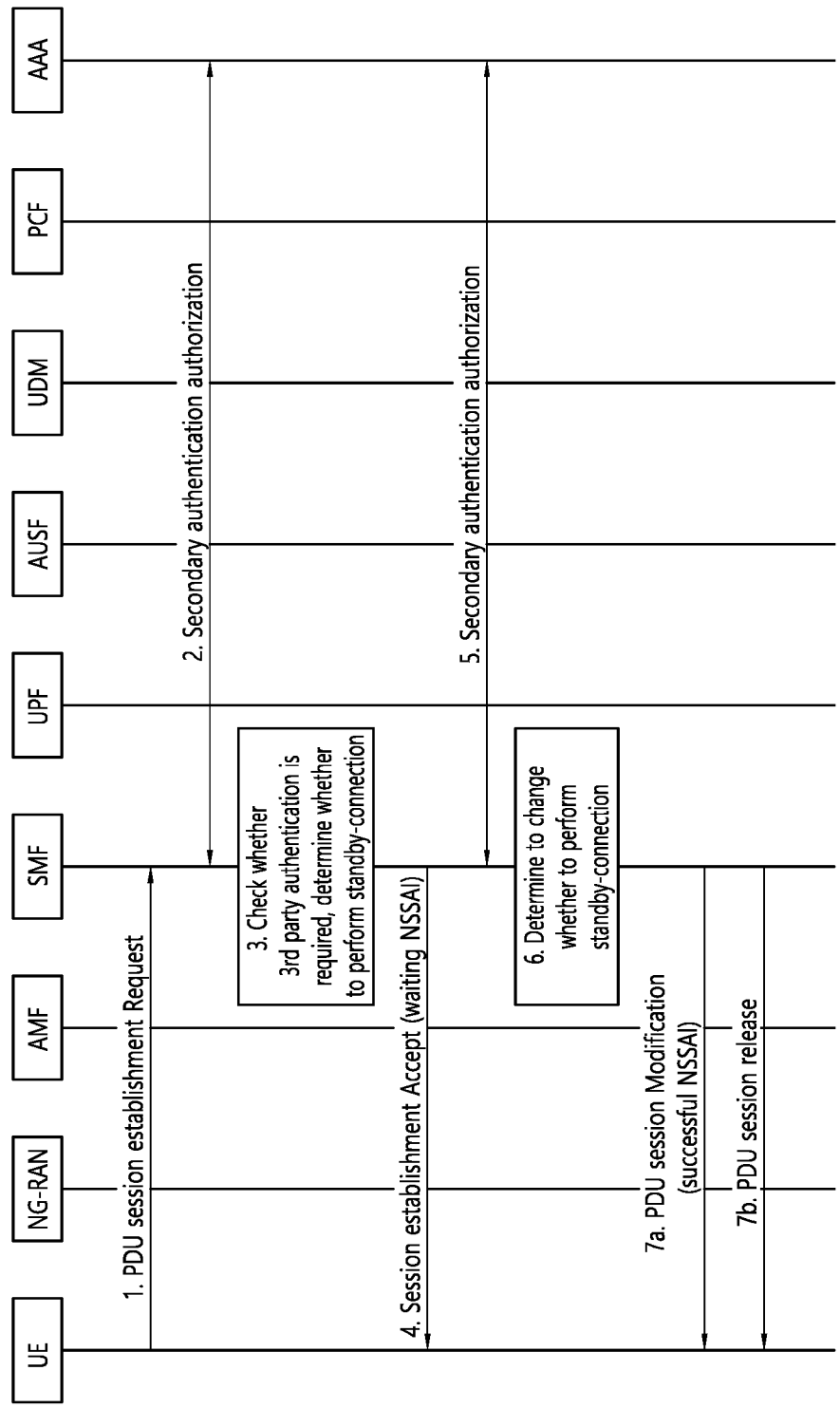
FIG. 17 shows an example of a signal flow diagram according to a third example of the first example of the disclosure of the present specification.

FIG. 17 shows an example of a signal flow diagram according to a third example of the first example of the disclosure of the present specification.

1) The UE (eg, UE) may transmit a PDU session establishment request message to the SMF. The registration request message may directly or indirectly include network slice information (eg, Requested NSSAI) to which the UE intends to access. "Indirectly include" means that the network slice information to be accessed by the requested DNN information (DNN information requested by the terminal through the PDU session establishment request message) is known as a network (eg, SMF) based on the prior art.

2) When the SMF receives the PDU session establishment request message, a PDU session establishment procedure (eg, the PDU session establishment procedure in FIGS. 6a and 6b) may be performed. And, the SMF may perform secondary authentication and/or authorization (Secondary authentication authorization) with other network nodes (eg, AAA, etc.).

3) The SMF may check whether $3^{rd}$ party authentication is required for a specific network slice (eg, a network slice to which the UE wants to access). Additionally, the SMF may determine whether to perform standby access. For example, the SMF may determine whether to temporarily include the terminal in the standby network slice. That is, the SMF may determine whether to wait by connecting the terminal to the standby network slice.

For example, in the following case, the SMF may determine to connect the terminal to the standby network slice.

When $3^{rd}$ party authentication is required for the network slice of the corresponding PDU session requested from the terminal, and when the SMF permits standby access to the terminal according to subscriber information and operator policy.

When $3^{rd}$ party authentication is required for the network slice for the default PDU session of the subscriber information of the terminal, and when the SMF permits standby access to the terminal according to the subscriber information and operator policy.

4) The network (eg, SMF) may transmit an access permission message to the terminal. For example, the SMF may transmit a PDU session establishment accept message. Here, the PDU session establishment accept message may include standby network slice information (eg, waiting NSSAI).

When step 4) is performed, the following description may be applied from the viewpoint of the terminal:

The terminal may establish a PDU session in the standby slice designated by the AMF. The terminal is connected to the designated standby slice and cannot provide services to the user, but the terminal may be in a state of being controlled for each network slice from the network. For example, control per network slice controlled by the network is for network management purposes, and may include an application of movement and charging policy of terminals belonging to the entire slice, application of slice-based access control, and/or a policy for reducing power consumption of the terminal.

5) A secondary authentication/authorization procedure may be performed. For example, a terminal, SMF, AUSF, AAA, etc. may perform a secondary authentication/authorization procedure.

6) SMF may determine whether it is necessary to change the standby connection status. For example, the SMF may examine whether it is necessary to change the standby connection state of the terminal. When the SMF receives a notification that the number of managed access terminals has decreased below the network limit from the network node in charge of network limit control (eg New NF, NSSFN, NWDAF, etc.), or when the SMF receives a notice that the network limit itself is increased due to operator policy and a larger number of terminals can be accommodated, the SMF needs to change the standby connection state of the terminal.

7-a or 7-b) According to the results of steps 5) and 6) described above (eg, the result of secondary authentication/authorization procedure), the network may transmit a message for updating network slice information or releasing terminal access to the terminal. For example, in step 7-a), if secondary authentication/authorization procedure is successful, The SMF may transmit a PDU session modification message (including successful NSSAI information, which means that a network slice is switched from the standby slice to the slice in which the corresponding PDU session is requested to be established) to the terminal. For another example, in step 7-b), if secondary authentication/authorization procedure fails, in order to release the connection of the terminal, the SMF may transmit a PDU session release message to the terminal.

2. Second Example of the Disclosure of the Present Specification

A second example of the disclosure of the present specification describes An example of a case where a device (eg, a terminal) that has not received a policy necessary for network access from a network, attempts an access for the first time (eg, when the corresponding terminal is used for the first time after the production of the terminal, etc.).

In the 5G communication system, a scenario in which various devices are used in various industries may be assumed.

For example, there is a scenario in which a device is connected to a specific 5G network in a specific smart factory. Different network slices and different policies can be operated for each 5G network in a smart factory such as a development factory. For this reason, the terminal/device used in such a factory may be released in a state in which the operator policy is configured at the stage in which the terminal/device is produced, unlike a smartphone used by a general user. In the case of these terminals/devices, the network does not provide services to these terminals/devices, but the network may allow standby access until the appropriate authentication and authorization process for these terminals/devices is completed. The network may allow a terminal/device to perform standby access to be controlled by the network. For such a terminal/device, the procedure related to 3rd party authentication described above in the first example of the disclosure of the present specification may be used together.

When the terminal/device according to the second example of the present disclosure attempts to access for the first time, the same operations as the example described in FIG. 14 or the example described in FIG. 16 may be performed.

3. UI (User Interaction)/UX (User Experience) Implementation Example According to the Disclosure of the Present Specification As described in the disclosure of this specification, when the terminal operates, the terminal (eg, a smart phone, an AR/VR device, a robot, a car, etc.) may provide UI/UX. Hereinafter, the display on which the terminal displays a screen (eg, UI/UX) may refer to the display 1041 of FIG. 11 and/or the display 1041 of FIG. 12. In addition, in the description with reference to FIGS. 18 to 25, the display 1041 may refer to the display 1041 of FIG. 11 and/or the display 1041 of FIG. 12.

As an example, in the step of performing the pre-configuration described in the example of FIG. 14, the terminal may receive information related to the standby network slice in advance from the user through the UI/UX displayed on the display 1041.

As another example, in the step of performing the user interaction described in the example of FIG. 14 (the user interaction step after receiving the waiting NSSAI information), the terminal may notify the user of information on access to the standby network slice (eg, temporary standby) through UI/UX displayed on the display 1041. In addition, the terminal may receive information on whether to accept the temporary standby by accessing to the standby network slice from the user, through the UI/UX displayed on the display 1041.

As another example, in the step of performing user interaction described in the example of FIG. 14 (user interaction step after receiving the NAS Command message), the terminal may provide information related to permitted network slice information (eg, allowed NSSAI) and/or rejected network slice information (eg, rejected NSSAI) may to the user through user interaction, through the UI/UX displayed on the display 1041.

In addition, upon receiving the response message (eg, registration acceptance message of FIGS. 14 to 16, or the PDU session establishment acceptance message of FIG. 17) to the request message (eg, the registration request message of FIGS. 14 to 16, or the PDU session establishment request message of FIG. 17), the terminal may perform an operation as in the following example:

Depending on whether the terminal accesses the standby network slice, the terminal may deliver information about the standby network slice to the user, by using method for providing information based on difference in icons (including color and blinking, etc.), specific message notification windows (e.g. notification windows displaying information about standby network slices), and/or the background color of the execution screen of the app the device is running. For example, when the standby network slice information (eg, waiting NSSAI) is included in the response message received by the terminal, through a method such as changing the background color of the icon, a specific message notification window, and/or the execution screen of the app the terminal is running, the terminal may display the UI/UX on the display 1041 to provide the user with information related to the standby network slice.

In order to determine whether to access the standby network slice (See user interaction after receiving the registration response message of FIG. 14, step 6 of FIG. 16, and step 6) of FIG. 17), the terminal may display UI/UX on the display 1041. For example, the terminal may display a preset screen on the display 1041. Before the response message to the request message is received, the terminal may display a preset screen on the display 1041. By displaying the preset screen on the display 1041, the terminal may receive information on whether to always access and wait for the standby network slice, whether to perform user interaction each time when receiving standby network slice information, and whether to always reject access when receiving standby network slice information, from the user. The terminal displays information such as waiting time (eg, waiting time based on waiting time information received along with standby network slice information) on the display 1041, such that the terminal may display pop-up window asking the user to wait on the display 1041.

The terminal may display information on the standby network slice on the display 1041 by displaying the UI/UX as described above. The terminal may receive the preset for the standby network slice from the user by displaying the UI/UX as described above. As described above, the terminal may display UI/UX to receive information from the user on whether to access the standby network slice from the user.

Hereinafter, with reference to the examples of FIGS. 18 to 25, an example in which the terminal implements UI/UX (Example: an example in which the terminal displays a screen related to the standby network slice on the display 1041) will be described in detail.

Figure 18:
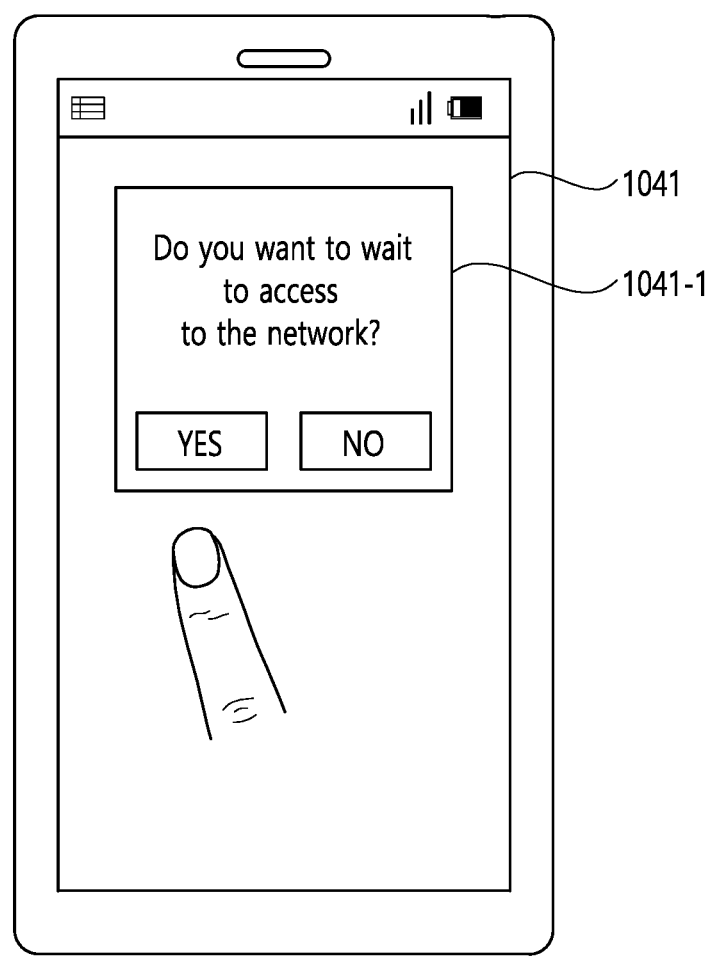
FIG. 18 shows a first example in which a terminal according to the disclosure of the present specification displays a UI/UX screen.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 18 shows a first example in which a terminal according to the disclosure of the present specification displays a UI/UX screen.

As described above, the terminal may receive a response message (response message to the request message transmitted by the terminal) including standby network slice information. The response message may include standby network slice information. The terminal may connect to the standby network slice and wait.

The terminal may display a guidance screen for asking the user whether to allow access to the standby network slice on the display 1041 as shown in the example of FIG. 18.

The terminal may display an object 1041-1 for asking the user whether to allow access to the standby network slice. The object 1041-1 of FIG. 18 includes the sentence "Would you like to connect to the network?", this is only an example, and the object 1041-1 may include any sentence including a content asking the user whether to allow access to the standby network slice. For example, the object 1041-1 may include sentences such as "The network slice you are trying to access is unreachable due to network slice limit control. Would you like to join the standby network?"

The terminal may determine whether to access the standby network slice (See user interaction after receiving the registration response message of FIG. 14, step 6 of FIG. 16, and step 6) of FIG. 17), according to the user's input to the object 1041-1. For example, when the user touches "Yes" on the object 1041-1, the terminal may access the standby network slice. When the user touches "No" on the object 1041-1, the terminal may not access the standby network slice.

For reference, in the step of performing the pre-configuration described in the example of FIG. 14, the terminal may display the example of FIG. 18. That is, the example of FIG. 18 may be used for presetting related to the standby network slice. For example, according to the user's input to the object 1041-1, the terminal may store a preset for whether to access the standby network slice.

Figure 19:
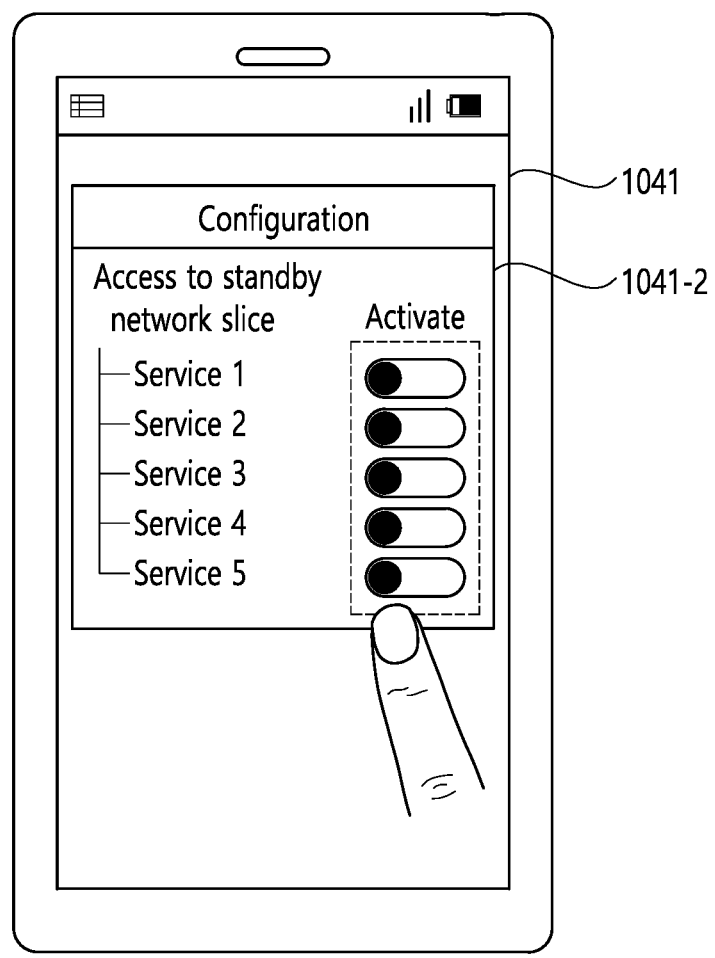
FIG. 19 shows a second example in which a terminal according to the disclosure of the present specification displays a UI/UX screen.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 19 shows a second example in which a terminal according to the disclosure of the present specification displays a UI/UX screen.

As described above, the UE may receive a response message (Response message to the request message sent by the terminal) including standby network slice information. The response message may include standby network slice information. The UE may connect to the standby network slice and wait.

The terminal may display a setting screen for asking the user whether to allow access to the standby network slice on the display 1041 as shown in the example of FIG. 19.

The terminal may display an object 1041-2 on the display 1041 for asking the user whether to activate (or allow, or use) access to the standby network slice for each service (services that the terminal can use). The object 1041-2 may include a button for asking the user whether to use or not to use the connection to the standby network slice for each service.

Here, the button included in the object 1041-2 is a toggle button or a flip-flop button as shown in FIG. 19, alternatively, the button may be an allow (or enable) button and a block (or disable) button.

For example, when the user touches a button related to service 2 and a button related to service 3 in the object 1041-2, the terminal may store information that the user wants to access the standby network slice related to service 2 and the standby network slice related to service 3. And, when the response message received by the terminal includes standby network slice information related to service 2 or standby network slice information related to service 3, the terminal may determine to access the standby network slice. When the received response message includes standby network slice information related to service 1, service 4, or service 5, the terminal may not access the standby network slice.

In the step of performing the pre-configuration described in the example of FIG. 14, the terminal may display the object 1041-2 described with reference to the example of FIG. 19 on the display 1041. That is, the example of FIG. 19 may be used for presetting related to the standby network slice. For example, according to the user's input to the object 1041-2, the terminal may store a preset for whether to access the standby network slice for each service.

Figure 20:
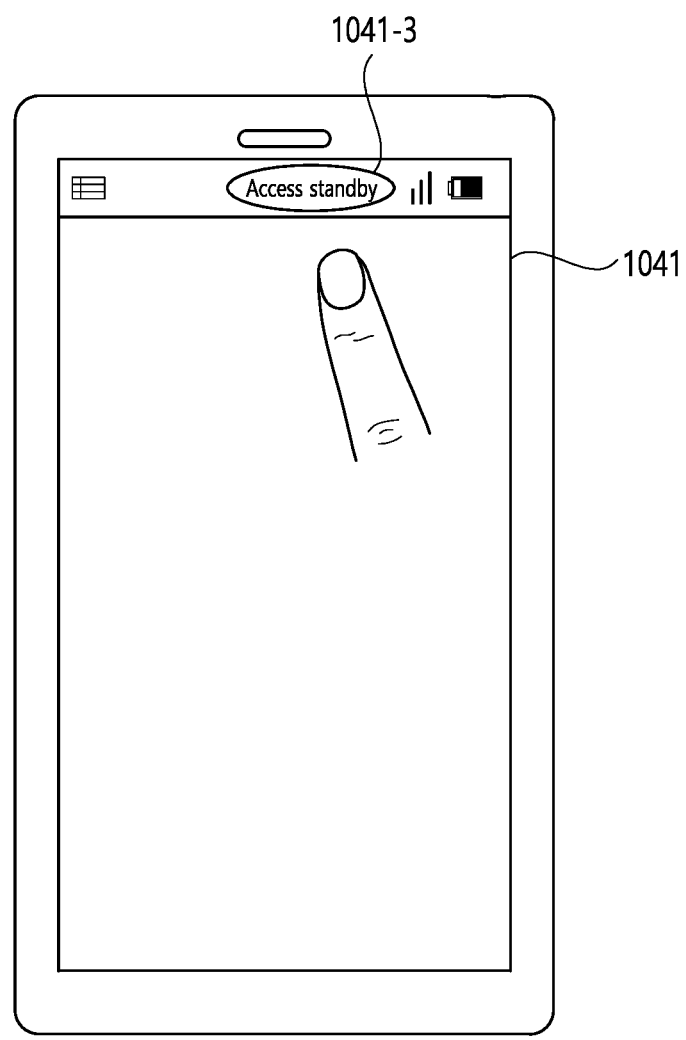
FIG. 20 shows a third example in which a terminal according to the disclosure of the present specification displays a UI/UX screen.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 20 shows a third example in which a terminal according to the disclosure of the present specification displays a UI/UX screen.

As described above, the terminal may receive a response message (response message to the request message transmitted by the terminal) including standby network slice information. The response message may include standby network slice information. The terminal may connect to the standby network slice and wait.

According to the various examples described above, the terminal may determine to access the standby network slice and connect to the standby network slice and wait. When the terminal connects to the standby network slice and waits, as in the example of FIG. 20, the terminal may display an indicator 1041-3 indicating (or implying) that the terminal is waiting on the display 1041. The indicator 1041-3 may be displayed on the display 1041 in a form having a flickering effect or a color changing effect.

In the example of FIG. 20, the indicator 1041-3 includes the word "waiting for connection", but this is only an example. The indicator 1041-3 may include arbitrary characters for notifying the user that the terminal is on standby by accessing the standby network slice. For example, it may include characters such as "standby" or "standby network slice".

Hereinafter, with reference to FIGS. 21 to 23, an example in which the terminal displays information such as waiting time on the display 1041 will be described. As described above, the UE may receive a response message (Response message to the request message sent by the terminal) including standby network slice information. The response message may include standby network slice information. The standby network slice information may include latency information.

Figure 21:
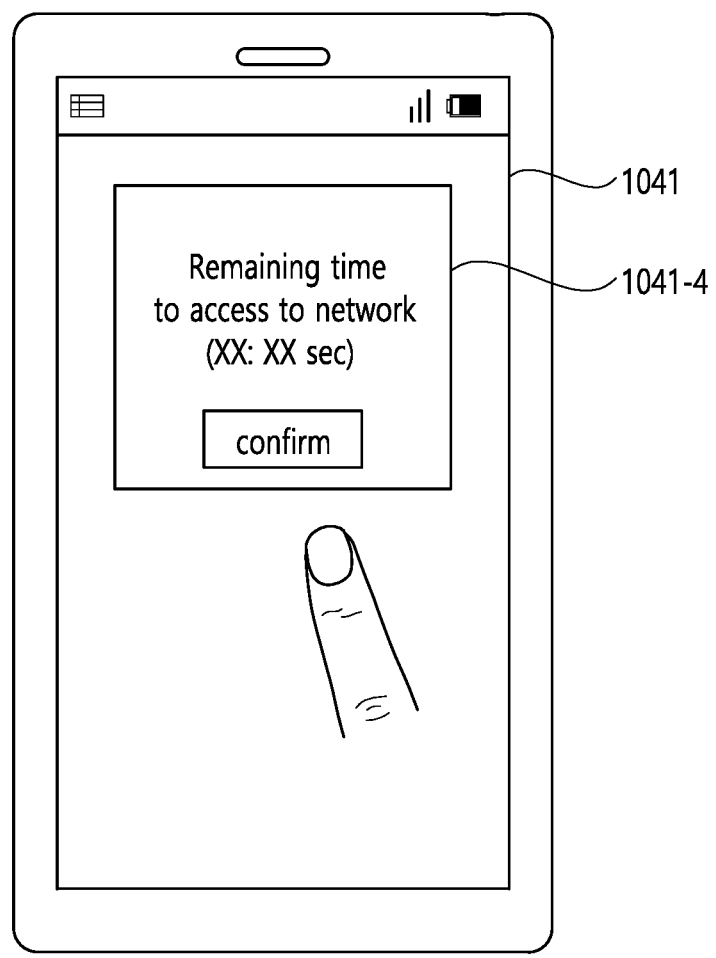
FIG. 21 shows a fourth example in which a terminal according to the disclosure of the present specification displays a UI/UX screen.
Figure 22:
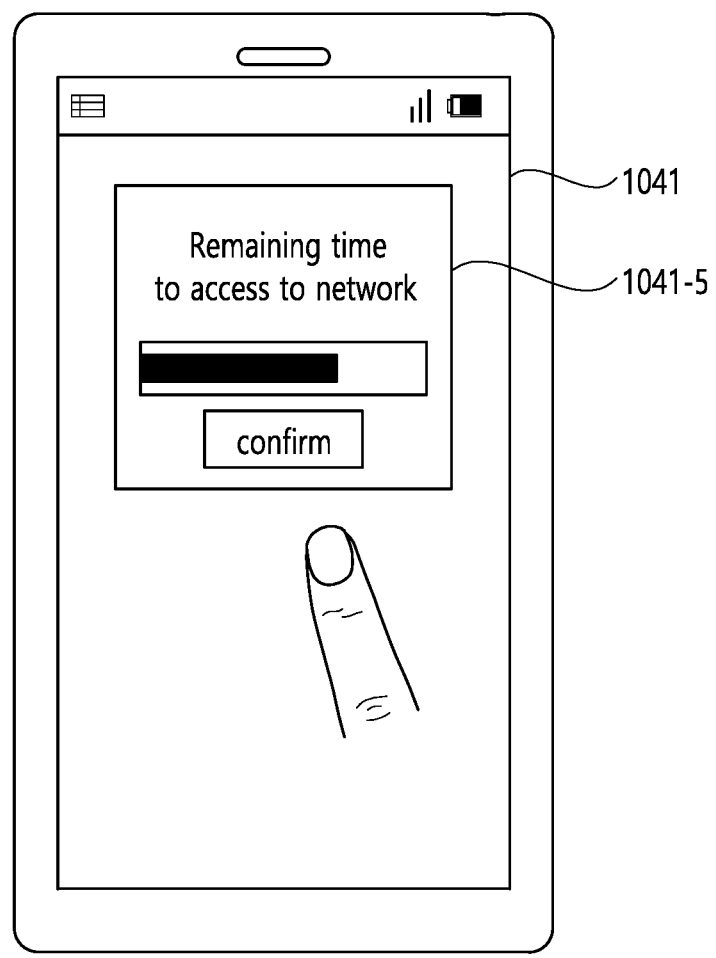
FIG. 22 shows a fifth example in which a terminal according to the disclosure of the present specification displays a UI/UX screen.
Figure 23:
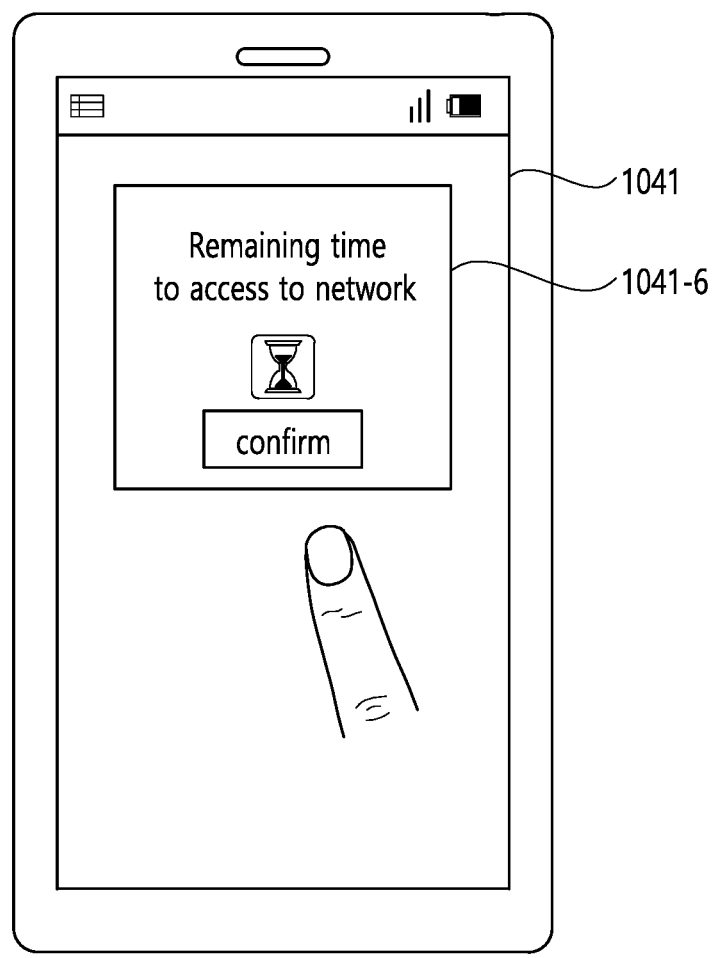
FIG. 23 shows a sixth example in which a terminal according to the disclosure of the present specification displays a UI/UX screen.

When the terminal receives a response message (response message to the request message transmitted by the terminal) including the standby network slice information, the terminal may display information on the waiting time by accessing the standby network slice on the display 1041 as in the examples of FIGS. 21 to 23.

For example, if the terminal decides to connect to the standby network slice and wait, the terminal may display an object (eg, 1041-4 to 1041-6) including information such as waiting time (e.g. waiting time based on waiting time information received along with latency network slice information), such as examples of FIGS. 21 to 23. The waiting (standby) time may refer to the time the terminal waits by accessing the standby network slice. In other words, the waiting time may mean the time remaining until the terminal accesses the network slice to be accessed through transmission of the request message in the state that the terminal is waiting. Objects (eg 1041-4 to 1041-6) may include information on the remaining time until the terminal accesses the network slice to be accessed through transmission of the request message, in a state where the terminal is waiting.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 21 shows a fourth example in which a terminal according to the disclosure of the present specification displays a UI/UX screen.

As described above, when the terminal receives a response message (response message to the request message transmitted by the terminal) including the standby network slice information, the terminal may display information on the waiting time by accessing the standby network slice on the display 1041. The terminal may connect to the standby network slice and wait.

For example, if the terminal decides to connect to the standby network slice and wait (or or when the terminal accesses and waits for the standby network slice), the terminal may display an object (eg, 1041-4) including information such as waiting time (e.g. waiting time based on waiting time information received along with latency network slice information), such as examples of FIG. 21.

In the example of FIG. 21, the terminal may display the object 1041-4 to inform the user of information that the terminal must wait for (xx:xx seconds) to access the network. The object 1041-4 may include information that the terminal is on standby (information that the terminal accesses the standby network slice) and information about the waiting time.

Although the object 1041-4 of FIG. 21 includes the sentence "waiting time remaining until accessing the network (xx minutes: xx seconds)", this is only an example, and the object 1041-4 may include an arbitrary sentence indicating information about the waiting time to connect to the standby network slice and wait for the user. For example, the object 1041-4 may include the sentence "waiting network slice access time (xx minutes: xx seconds)" or "waiting time (xx minutes: xx seconds)".

When the user touches "OK" displayed on the object 1041-4, the terminal may not display the object 1041-4.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 22 shows a fifth example in which a terminal according to the disclosure of the present specification displays a UI/UX screen.

As described above, when the terminal receives a response message (response message to the request message transmitted by the terminal) including the standby network slice information, the terminal may display information on the waiting time by accessing the standby network slice on the display 1041. The terminal may connect to the standby network slice and wait.

For example, if the terminal decides to connect to the standby network slice and wait (or or when the terminal accesses and waits for the standby network slice), the terminal may display an object (eg, 1041-5) including information such as waiting time (e.g. waiting time based on waiting time information received along with latency network slice information), such as examples of FIG. 22.

In the example of FIG. 22, the terminal may display the object 1041-5 to inform the user of information that the terminal must wait for a waiting time to access the network in the form of a bar. The object 1041-6 may include information that the terminal is waiting (information that the terminal accesses the standby network slice) and information about the waiting time (eg, displayed in the form of a bar that increases over time within a rectangular frame).

In the example of FIG. 22, the object 1041-5 displays the waiting time in the form of a bar. The black bar within the rectangular border displayed on the object 1041-5 may increase over time. The black bar displayed on the object 1041-5 starts to be displayed at the left boundary of the rectangular frame, and may reach the right boundary of the rectangular frame when the waiting time ends. "Black" means an exemplary color for describing the stick of the object 1041-5, the color of the stick displayed on the object 1041-5 may be a different color.

Although the object 1041-5 of FIG. 22 includes the sentence "waiting time remaining until accessing the network", this is only an example, and the object 1041-5 may include an arbitrary sentence indicating information about the waiting time to connect to the standby network slice and wait for the user. For example, the object 1041-5 may include a sentence "standby network slice access time" or "waiting time".

When the user touches "OK" displayed on the object 1041-5, the terminal may not display the object 1041-5.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 23 shows a sixth example in which a terminal according to the disclosure of the present specification displays a UI/UX screen.

As described above, when the terminal receives a response message (response message to the request message transmitted by the terminal) including the standby network slice information, the terminal may display information on the waiting time by accessing the standby network slice on the display 1041. The terminal may connect to the standby network slice and wait.

For example, if the terminal decides to connect to the standby network slice and wait (or or when the terminal accesses and waits for the standby network slice), the terminal may display an object (eg, 1041-6) including information such as waiting time (e.g. waiting time based on waiting time information received along with latency network slice information), such as examples of FIG. 23.

In the example of FIG. 22, the terminal may display the object 1041-6 to inform the user of information that the terminal must wait for a waiting time to access the network in the form of an hourglass. The object 1041-6 may include information that the terminal is waiting (information that the terminal accesses the standby network slice) and information about the waiting time (eg, displayed in the form of an hourglass that changes as the time connected to the standby network elapses).

In the example of FIG. 23, the object 1041-6 displays the waiting time in the form of an hourglass. The hourglass displayed on the object 1041-6 begins to be displayed in a form full of sand at the top of the hourglass, at the end of the waiting time, you can reach the bottom of the hourglass in the form of full sand.

Although the object 1041-6 of FIG. 23 includes the sentence "waiting time remaining until accessing the network", this is only an example, and the object 1041-5 may include an arbitrary sentence indicating information about the waiting time to connect to the standby network slice and wait for the user. For example, the object 1041-5 may include a sentence "standby network slice access time" or "waiting time".

When the user touches "OK" displayed on the object 1041-6, the terminal may not display the object 1041-6.

Figure 24:
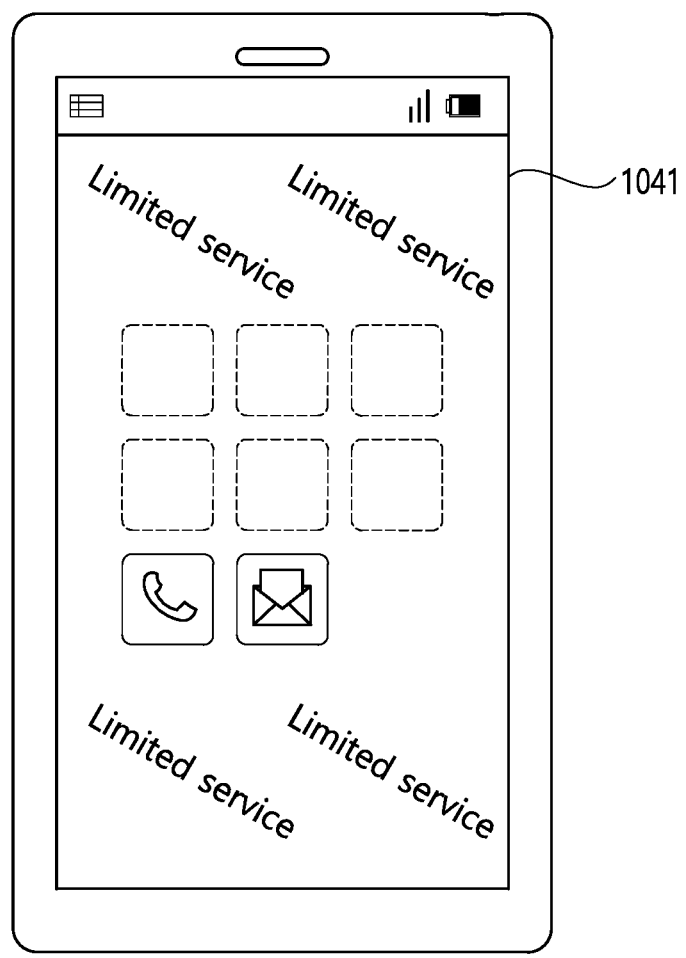
FIG. 24 shows a seventh example in which a terminal according to the disclosure of the present specification displays a UI/UX screen.
Figure 25:
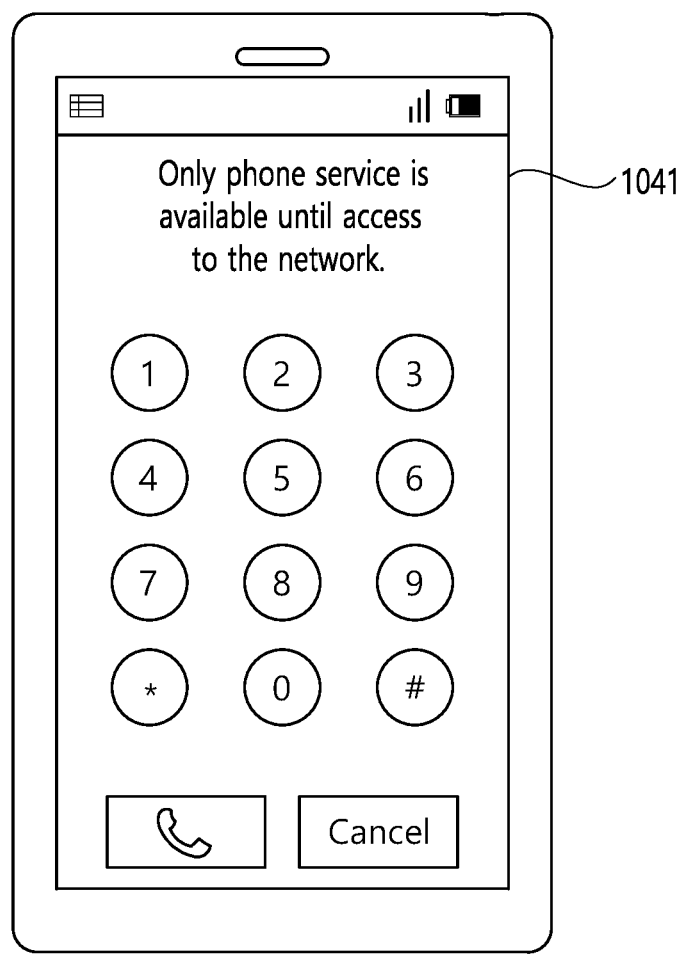
FIG. 25 shows an eighth example in which a terminal according to the disclosure of the present specification displays a UI/UX screen.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 24 shows a seventh example in which a terminal according to the disclosure of the present specification displays a UI/UX screen. FIG. 25 shows an eighth example in which a terminal according to the disclosure of the present specification displays a UI/UX screen.

As described above, when the terminal receives a response message (response message to the request message transmitted by the terminal) including the standby network slice information, the UE may access to the standby network slice and wait. The standby network slice information may include wait time (or latency) information.

For example, when the terminal decides to wait by accessing the standby network slice (or when the terminal waits by accessing the standby network slice), if there is waiting time (i.e., if there is still time left until accessing the network slice to be accessed), the terminal may display information indicating that only a limited service is available on the display 1041 as in the example of FIG. 24. For example, when a screen such as the example of FIG. 24 is displayed on the display 1041, the terminal may operate in a predetermined mode, for example, in the safe mode provided by Microsoft's operating system (eg, Windows). The screen according to the predetermined operation mode is like the safe mode screen of the Windows PC, may have differences with a screen displayed when the terminal performs a general operation, such as resolution, color, and/or font.

Specifically, as shown in FIG. 24, the terminal does not display the icons of all installed applications, the terminal may display only icons of executable applications (such as phone applications and text messaging applications). That is, the terminal may not display icons of unexecutable applications on the display 1041 at all. Alternatively, the icon of the non-executable application is displayed in a black-and-white form, a transparent form, or a form having a different shade from the icon of the executable application, the icon of the executable application may be displayed in a colored form. The executable application may include, for example, a service permitted in an emergency situation (eg, an emergency call service, an emergency text service). As another example, the executable application may include a service executable in a network slice (Example: When there is a network slice to which the terminal is previously connected) to which the terminal is previously connected.

And, in order to inform users that only limited services are available, the terminal may display a predefined background screen image (eg the image used when connecting to a standby network slice), instead of the background screen image specified by the user. Alternatively, as shown in the example of FIG. 24, the terminal may display information indicating that only a limited service is available in the background screen image.

When the user who has checked the displayed screen as in the example of FIG. 24 executes the phone application, the terminal may display a screen as shown in FIG. 25. The screen shown in FIG. 25 may include information (eg number, *, #, call button, Cancel) for notifying the user of information generally displayed in the phone application and information (Example: "Only phone service is available until you connect to the network") that only a limited service is available.

The example of FIG. 25 includes the sentence "Only phone service is available until access to the network", but this is only an example, and the terminal may display an arbitrary sentence on the display 1041 to inform the user of information that only a limited service is available. For example, the terminal may display sentences such as "connecting to standby network" and "only limited service is available".

For reference, referring to FIG. 13 above, the first circuit 1020-1 of FIG. 13 may operate as a network slice manager, the second circuit 1020-2 may operate as a screen display unit, the third circuit 1020-3 may operate as a setting information manager. The network slice management unit 1020-1 performs procedure such as performing communication with the network, transmitting a request message to the network and receiving a response message including standby network slice information from the network, etc. The screen display unit 1020-2 may display a UI/UX screen related to a network slice. For example, the screen display unit 1020-2 may display the screens described in the examples of FIGS. 18 to 25. The setting information management unit 1020-3 may store setting information related to a screen display and a network slice.

As described in the disclosure of the present specification, a network control node (eg, AMF) may receive an access request from a terminal. When the network control node is in a situation where it is difficult to allow access of the terminal according to the management index set for the network slice, the network control node transmits temporary permission information (eg, standby network slice information and latency information, etc.) to the terminal, and may allow a special access of the terminal.

As described in the disclosure of this specification, when the terminal receives temporary permission information from the network control node (eg, AMF), through preset and/or interaction with the user, the terminal may determine whether to wait (eg, whether the terminal accesses the standby network slice). In addition, the terminal may transmit the determination result of whether to wait to the network through an arbitrary NAS message (eg, an Uplink NAS Transport message).

As described in the disclosure of the present specification, the network slice indicator management node may manage a waiting list of temporarily authorized terminals and provide the information to the network control node.

As described in the disclosure of the present specification, communication related to a network slice can be effectively performed. For example, by using a standby network slice, 5G industries/services can be provided more flexibly. In addition, as described in the disclosure of this specification, based on the UE connects to the standby network slice and waits, the UE may perform an operation to reduce the power consumption of the UE. A network node (eg, AMF) does not simply transmit a rejection message including a back-off timer to the UE, by transmitting standby network slice information, when the UE is changed to an environment that can receive the service, the UE can be switched immediately to use the service. The network slice indicator management node can manage the standby network slice, so that communication related to the network slice can be performed effectively.

As described in the disclosure of this specification, the terminal displays a UI/UX screen on the display 1041, such that the terminal may be input settings related to the standby network slice may from the user. By displaying the UI/UX screen on the display 1041, the terminal may inform the user of information related to the standby network slice. By displaying the UI/UX screen on the display 1041, the terminal may inform the user that the terminal is in a standby state by accessing the standby network slice.

As described in the disclosure of this specification, with respect to a network slice, a user's selection, a user's preference, a user's setting, and/or a user's input may be effectively reflected. Due to this, with respect to the network slice, the terminal may perform network slice-related communication in consideration of the terminal's request service or the terminal user's will/preference.

For reference, the operation of the terminal (eg, UE) described in this specification may be implemented by the apparatus of FIGS. 11 to 13 described above or by the apparatus of FIGS. 26 to 29 to be described below. For example, the terminal (eg, UE) may be the first device 100a or the second device 100b of FIG. 27. For example, an operation of a terminal (eg, UE) described herein may be processed by one or more processors 1020a or 1020b. The operation of the terminal described in this specification may be stored in one or more memories 1010a or 1010b in the form of an instruction/program (e.g. instruction, executable code) executable by one or more processors 1020a or 1020b. One or more processors 1020a or 1020b control one or more memories 1010a or 1010b and one or more transceivers 1031a or 1031b, and execute instructions/programs stored in one or more memories 1010a or 1010b as disclosed herein, thereby perform the operation of the terminal (eg, UE) described in the disclosure of the present specification.

In addition, instructions for performing an operation of a terminal (eg, a UE) described in the disclosure of the present specification may be stored in a non-volatile computer-readable storage medium in which it is recorded. The storage medium may be included in one or more memories 1010a or 1010b. And, the instructions recorded in the storage medium may be executed by one or more processors 1020a or 1020b to perform the operation of the terminal (eg, a UE) described in the disclosure of the present specification.

For reference, the operation of a network node (eg, AMF, New NF, NWDAF, SMF, UPF, AUSF, UDM, PCF, AAA, etc.) or a base station (eg, NG-RAN, gNB, eNB, RAN, etc.) described in this specification will be may be implemented by the apparatus described below in FIG. 26 to 20. For example, the network node (eg, AMF, New NF, NWDAF, SMF, UPF, AUSF, UDM, PCF, AAA, etc.) or a base station (eg, NG-RAN, gNB, eNB, RAN, etc.) may be the first device 100a or the second device 100b of FIG. 27. For example, the operation of the network node (eg, AMF, SMF, UPF, PCF, etc) described herein may be processed by one or more processors 1020a or 1020b. The operations of the network node or base station described herein may be stored in one or more memories 1010a or 1010b in the form of instructions/programs (e.g. instruction, executable code) executable by one or more processors 1020a or 1020b. One or more processors 1020a or 1020b control one or more memories 1010a or 1010b and one or more transceivers 1031a or 1031b, and may perform the operation of the network node (eg, AMF, New NF, NWDAF, SMF, UPF, AUSF, UDM, PCF, AAA, etc.) or the base station (eg, NG-RAN, gNB, eNB, RAN, etc.) described in the disclosure of the present specification by executing instructions/programs stored in one or more memories 1010a or 1010b as disclosed herein.

In addition, the instructions for performing the operation of the network nodes described in the disclosure of this specification (eg, AMF, New NF, NWDAF, SMF, UPF, AUSF, UDM, PCF, AAA, etc.) or a base station (eg, NG-RAN, gNB, eNB, RAN, etc.) may be stored in a non-volatile computer-readable storage medium recording. The storage medium may be included in one or more memories 1010a or 1010b. And, the instructions recorded in the storage medium are executed by one or more processors 1020a or 1020b to perform operations of the network node (eg, AMF, New NF, NWDAF, SMF, UPF, AUSF, UDM, PCF, AAA, etc.) or base station (eg, NG-RAN, gNB, eNB, RAN, etc.) described in the disclosure of the present specification.

IV. Examples to which the Disclosure of the Present Specification Applies

Although not limited thereto, the various descriptions, functions, procedures, suggestions, methods, and/or operational flowcharts of the disclosure of the present specification disclosed in this document may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

FIG. 26 illustrates a wireless communication system according to an embodiment.

Referring to FIG. 26, the wireless communication system may include a first device 100a and a second device 100b. The first device 100a and the second device 100b may be wireless communication devices capable of performing wireless communication.

The first device 100a may be a UE described in the disclosure of the present specification. Or, the first device 100a may be a base station, a network node (e.g. AMF, New NF, NWDAF, SMF, UPF, AUSF, UDM, PCF, AAA etc,), a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g. AMF, New NF, NWDAF, SMF, UPF, AUSF, UDM, PCF, AAA etc,) described in the disclosure of the present specification. Or, the second device 100b may be a base station, a network node, a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 27:
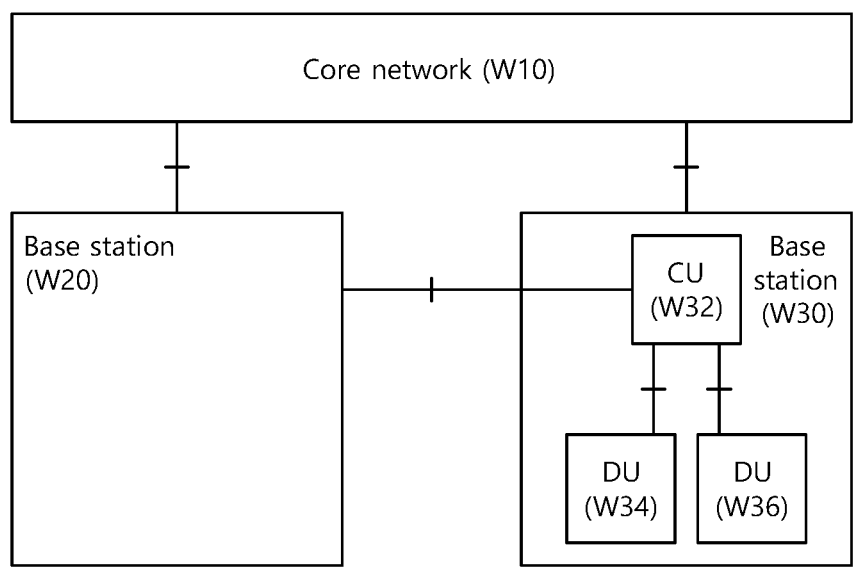
FIG. 27 illustrates a block diagram of a network node according to an embodiment.

FIG. 27 illustrates a block diagram of a network node according to an embodiment.

In particular, FIG. 27 is a diagram illustrating in detail a case in which abase station is divided into a Central Unit (CU) and a Distributed Unit (DU).

Referring to FIG. 27, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 28:
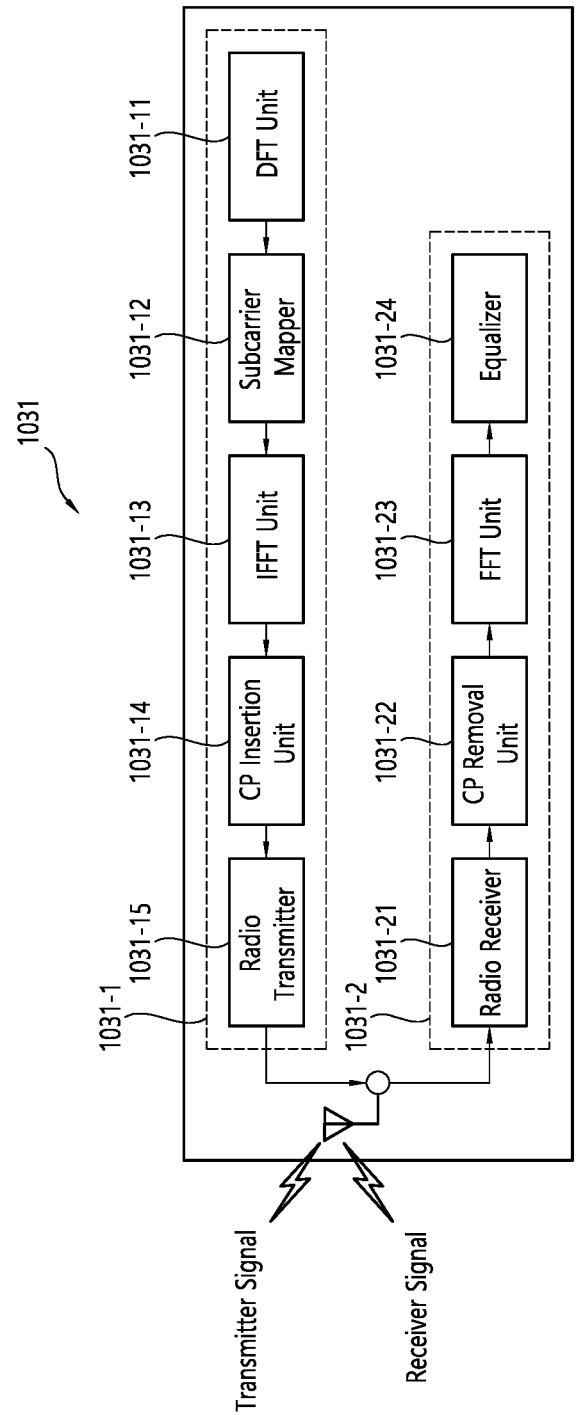
FIG. 28 is a detailed block diagram illustrating the transceiver of the first device shown in FIG. 26 or the transceiver of the device shown in FIG. 11 in detail.

FIG. 28 is a detailed block diagram illustrating the transceiver of the first device shown in FIG. 26 or the transceiver of the device shown in FIG. 11 in detail.

Referring to FIG. 28, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Figure 29:
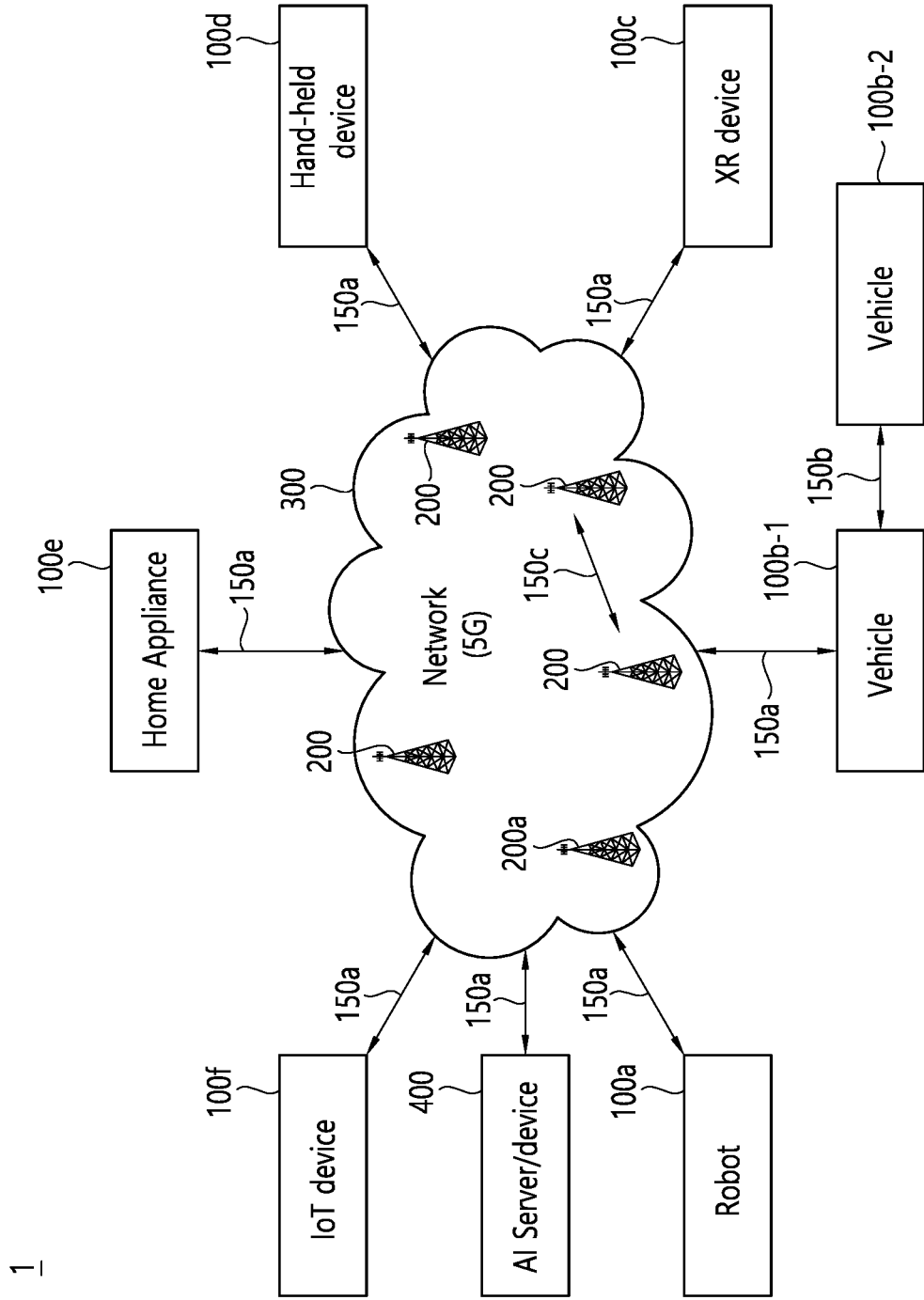
FIG. 29 illustrates a communication system 1 applied to the disclosure of the present specification.

FIG. 29 illustrates a communication system 1 applied to the disclosure of the present specification.

Referring to FIG. 29, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

Here, the wireless communication technology implemented in the wireless devices 100a to 100f, 400, and 100 and 200 of FIG. 27 of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100a to 100f, 400, 100 and 200 in FIG. 27 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100a to 100f, 400, and 100 and 200 of FIG. 27 of the present specification may include at least any one of ZigBee, Bluetooth, and low-power wide area network (Low) in consideration of low-power communication. Power Wide Area Network (LPWAN), but is not limited to the above-described name. For example, the ZigBee technology can create PAN (personal area networks) related to small/low-power digital communication based on various standards such as IEEE 802.15.4, and can be called by various names.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method comprising:
   transmitting a registration request message to a network node,
   wherein the registration request message includes requested network slice information which includes one or more network slice information and corresponds to a network slice with which a user equipment (UE) intends to register;
   receiving a registration accept message from the network node in response to the registration request message;
   based on a network slice-specific authentication procedure performed by the network node being successfully completed, receiving a configuration update message including allowed network slice information from the network node;
   based on the network slice-specific authentication procedure performed by the network node being failed, receiving a deregistration request message from the network node; and
   based on the registration accept message including information related to a standby network slice,
   accessing the standby network slice based on the information related to the standby network slice.

2. The method of claim 1, further comprising:
   determining whether to access the standby network slice based on the information related to the standby network slice and a configuration related to the standby network slice.

3. The method of claim 1, further comprising:
   after being connected to the standby network slice, performing an operation to reduce power consumption of the UE.

4. The method of claim 3,
   wherein the operation to reduce power consumption of the UE is a MICO (Mobile Initiated Connection Only) mode, or an extended idle mode DRX (Discontinuous Reception).

5. The method of claim 1, further comprising:
   displaying information informing that the standby network slice is connected to a display of the UE, based on the information related to the standby network slice.

6. The method of claim 5, further comprising:
   displaying a pre-configuration screen related to whether to access the standby network slice.

7. The method of claim 6, further comprising:
   wherein the pre-configuration screen includes an object for receiving a setting related to whether to access the standby network slice for each of one or more services that the UE can use.

8. The method of claim 6,
   wherein whether to access the standby network slice is determined, based on the information received through the pre-configuration screen.

9. The method of claim 5,
   wherein the information related to the standby network slice includes standby time information,
   information informing standby time based on the standby time information is displayed together with the information informing that the standby network slice is connected.

10. The method of claim 5, further comprising:
    determining whether to connect to the standby network.

11. The method of claim 10, wherein the determining includes:
    displaying an object on the display of the UE for asking the user whether to allow access to the standby network slice; and
    determining whether to access the standby network based on a user's input to the object for asking the user whether to allow access to the standby network slice.

12. The method of claim 11,
    where the user's input to the object for asking the user whether to allow access to the standby network slice is an input that allows access to the standby network slice, the access to the standby network slice is allowed.

13. The method of claim 11,
    where the user's input to the object for asking the user whether to allow access to the standby network slice is an input that does not allow access to the standby network slice, the access to the standby network slice is not allowed.

14. A User Equipment (UE) comprising:
at least one transceiver;
at least one processor;
and
at least one memory operably electrically connectable to the at least one processor and storing instructions that, based on being executed by the at least one processor, perform operations comprising:
transmitting, via the at least one transceiver, a registration request message to a network node,
wherein the registration request message includes requested network slice information which includes one or more network slice information and corresponds to a network slice with which a user equipment (UE) intends to register;
receiving, via the at least one transceiver, a registration accept message from the network node in response to the registration request message;
based on a network slice-specific authentication procedure performed by the network node being successfully completed, receiving, via the at least one transceiver, a configuration update message including allowed network slice information from the network node;
based on the network slice-specific authentication procedure performed by the network node being failed, receiving, via the at least one transceiver, a deregistration request message from the network node; and
based on the registration accept message including information related to a standby network slice, accessing the standby network slice based on the information related to the standby network slice.

* * * * *